US012563490B2

(12) United States Patent     (10) Patent No.: US 12,563,490 B2

He et al.     (45) Date of Patent: Feb. 24, 2026

(54) POWER EFFICIENT COMMUNICATION WITH WIRELESS SMART REPEATER

(71) Applicant: Apple Inc., Cupertino, CA (US)

(72) Inventors: Hong He, Cupertino, CA (US); Wei Zeng, Cupertino, CA (US); Haitong Sun, Cupertino, CA (US); Dawei Zhang, Cupertino, CA (US); Yushu Zhang, Chaoyang District (CN); Chunhai Yao, Beijing (CN); Weidong Yang, San Diego, CA (US); Chunxuan Ye, San Diego, CA (US); Oghenekome Oteri, San Diego, CA (US); Jie Cui, San Jose, CA (US)

(73) Assignee: Apple Inc., Cupertino, CA (US)

( * ) Notice: Subject to any disclaimer, the term of this patent is extended or adjusted under 35 U.S.C. 154(b) by 380 days.

(21) Appl. No.: 18/096,688

(22) Filed: Jan. 13, 2023

(65) Prior Publication Data

US 2023/0300742 A1     Sep. 21, 2023

Related U.S. Application Data

(60) Provisional application No. 63/309,532, filed on Feb. 12, 2022.

(51) Int. Cl.
| | |
|---|---|
| *H04W 52/02* | (2009.01) |
| *H04L 5/00* | (2006.01) |

(Continued)

(52) U.S. Cl.
CPC ....... *H04W 52/0216* (2013.01); *H04L 5/0098* (2013.01); *H04W 52/248* (2013.01); *H04W 76/28* (2018.02)

(58) Field of Classification Search
CPC ........... H04W 52/0216; H04W 52/248; H04W 52/0206; H04W 52/0229; H04W 52/0235;

(Continued)

(56) References Cited

U.S. PATENT DOCUMENTS

| | | | | |
|---|---|---|---|---|
| 9,807,672 | B1 * | 10/2017 | Singh | .................... H04L 5/0098 |
| 11,962,398 | B2 * | 4/2024 | Abedini | ............ H04W 72/0473 |

(Continued)

FOREIGN PATENT DOCUMENTS

| | | |
|---|---|---|
| EP | 3749003 A1 | 9/2020 |
| WO | 2020020340 A1 | 1/2020 |

OTHER PUBLICATIONS

3rd Generation Partnership Project; Technical Specification Group Radio Access Network; NR; Physical layer procedures for control (Release 17); 3GPP TS 38.213 V17.0.0; Dec. 2021.

(Continued)

*Primary Examiner* — Robert C Scheibel

(74) *Attorney, Agent, or Firm* — Eschweiler & Potashnik, LLC; Ningjiao Zhang

(57) ABSTRACT

A smart repeater (SMR) can be configured to amplify and forward data from a base station based on received control information for managing power efficiency of on-off operations. The SMR can configure a power control mechanism based on the control information to adapt one or more bandwidths associated with the SMR based on the control information to save power and forward the communications to the base station or the UE. The control information can include a component carrier (CC) index or a bandwidth part (BWP) identifier (ID), and a set of parameters to configure on-off operations of the one or more bandwidths according to one or more CCs or BWPs.

15 Claims, 13 Drawing Sheets

(51) Int. Cl.
　　*H04W 52/24*　　　　(2009.01)
　　*H04W 76/28*　　　　(2018.01)

(58) Field of Classification Search
　　CPC ......... H04W 52/0241; H04W 52/0274; H04W
　　　　　　52/34; H04W 52/46; H04W 52/243;
　　　　　　H04W 52/38; H04W 76/28; H04W
　　　　　　72/0453; H04L 5/0098; Y02D 30/70;
　　　　　　H04B 7/15528; H04B 7/155
　　See application file for complete search history.

(56)　　　　　　　　References Cited

U.S. PATENT DOCUMENTS

| | | | |
|---|---|---|---|
| 2021/0306065 A1* | 9/2021 | Abedini .................... | H04L 5/14 |
| 2023/0054824 A1* | 2/2023 | Abedini ............... | H04B 17/252 |
| 2023/0093843 A1* | 3/2023 | Wu ....................... | H04L 5/0098 |
| | | | 370/329 |
| 2024/0014862 A1* | 1/2024 | Duan ................. | H04B 7/04013 |
| 2024/0022315 A1* | 1/2024 | Kusashima ........... | H04W 16/26 |
| 2024/0162973 A1* | 5/2024 | Peng .................... | H04L 5/1469 |

OTHER PUBLICATIONS

3rd Generation Partnership Project; Technical Specification Group Radio Access Network; NR; Medium Access Control (MAC) protocol specification (Release 16); 3GPP TS 38.321 V16.7.0; Dec. 2021.

Moderator (Qualcomm); Summary of email discussions on NR Repeaters; DT3GPP TSG-RAN Meeting #90e; RP-20xxxx; Dec. 7, 2020.

ZTE Corporation; New SI: Study on NR Smart Repeaters; 3GPP TSSG RAN Meeting #94e; RP-213592; Dec. 6, 2021.

ZTE Corporation; New SI: Study on NR Smart Repeaters; 3GPP TSG RAN Meeting #94e; RP-213592; Dec. 6, 2021.

* cited by examiner

APPLICATION SERVER(S)

140
138

150

EXTERNAL NETWORK(S)

136

134

NETWORK (NW) ELEMENT(S) / COMPONENT(S)

132

130

126

128

124

RAN

120

122-1

123

122-2

170

SMR

172

174

114-1

114-2

UE

UE 110-1

112

110-2

AP

118

116

100

300

To antenna(s) and/or wired
connection(s)

PROCESSOR(S)

310

COMMUNICATION (E.G.,
TRANSCEIVER, Tx, Rx)
CIRCUITRY

320

MEMORY     330

TRS for SMR#0

TRS for SMR#1

TRS for SMR#2

1200

POWER EFFICIENT COMMUNICATION WITH WIRELESS SMART REPEATER

CROSS-REFERENCE TO RELATED APPLICATIONS

The application claims the benefit of U.S. Provisional Patent Application 63/309,532 filed Feb. 12, 2022, entitled "POWER EFFICIENT COMMUNICATION WITH WIRE-LESS SMART REPEATER", the contents of which are herein incorporated by reference in their entirety.

FIELD

The present disclosure relates to wireless technology including power efficient communication with a wireless smart repeater (SMR).

BACKGROUND

Mobile communication in the next generation wireless communication system, 5G or new radio (NR) network, will provide ubiquitous connectivity and access to information, as well as ability to share data, around the globe. 5G networks with network slicing will be a unified, service-based framework that will target versatile, and sometimes conflicting, performance criteria to provide services to vastly heterogeneous application domains ranging from Enhanced Mobile Broadband (eMBB) to massive Machine-Type Communications (mMTC), Ultra-Reliable Low-Latency Communications (URLLC), and other communications.

DETAILED DESCRIPTION

Figure 1:
FIG. 1 illustrates an exemplary block diagram illustrating an example of user equipment(s) (UEs) communicatively coupled a network with network components as peer devices useable in connection with various embodiments (aspects) described herein.

The following detailed description refers to the accompanying drawings. Like reference numbers in different drawings may identify the same or similar features, elements, operations, etc. Additionally, the present disclosure is not limited to the following description as other implementations may be utilized, and structural or logical changes made, without departing from the scope of the present disclosure.

Network devices helping to extend coverage in cellular networks include smart repeaters. Repeaters amplify radio signals and are generally not smart devices capable of programming or processing input changes. However, smart repeaters can operate to selectively amplify in time, direction or frequency, and can be capable of programming or processing input changes for execution of instructions. Network energy savings can also be obtained by power down/off when there is no RF signal to amplify and powering back on when needed.

A smart repeater can include other components or names such as a reconfigurable intelligent surface (RIS), an intelligent reflecting surface, a large intelligent surface, a holographic radio or the like. A smart repeater (SMR) can operate as a system node acting as a smart radio surface between a base station and an end user device, user equipment (UE) or other terminal to move signals around with surfaces that have various reflective, refractive or absorption characteristics, and comprise many small antennas or meta-materials deployed or shaped as desired into everyday objects. Such nodes in place can enable the signal between a base station and UE to be dynamically configured by making a channel path programmable.

Deployment of regular full-stack cells is not always practical (e.g., where no backhaul is available). As such, various other types of network nodes have been considered to increase mobile operators' flexibility for their network deployments. For example, one type of network node is a radio frequency (RF) repeater. RF repeaters can be used in network deployments to supplement the coverage provided by regular full-stack cells with various transmission power characteristics. RF repeaters can constitute a simple and cost-effective way to improve network coverage. The main advantages of RF repeaters are their low-cost, their ease of deployment and the fact that they do not increase latency. The main disadvantage with legacy repeaters is that they amplify signal and noise and, hence, may contribute to an increase of interference (pollution) in the system. Within RF repeaters, there are different categories depending on the power characteristics and the amount of spectrum that they are configured to amplify (e.g., a single band, multi-band, etc.). RF repeaters are a non-regenerative type of relay nodes that amplify-and-forward the signals they receive. RF repeaters are typically full-duplex nodes, and they do not differentiate between uplink (UL) and downlink (DL) from a transmission or reception standpoint.

As New Radio (NR) specifications move to higher frequencies (around 4 GHz for frequency range (FR) 1 deployments and above 24 GHz for FR2), propagation conditions degrade compared to lower frequencies, exacerbating the coverage challenges. These frequency bands defined at this higher frequency regime operate with time division duplexing (TDD), while RF repeaters operate with frequency division duplexing (FDD) typically. Another common property of these NR systems is the use of multi-beam operation with associated beam management. Beamforming transmissions to individual users can be fundamental to coverage. A simple RF repeater that the network is agnostic to may be unable to achieve the requisite beamforming gain.

As such, another type of network node that can leverage the advantages found in RF repeaters along with other advantages found in an integrated access and backhaul (IAB) node can be a smart repeater (SMR). SMRs can be nodes operating with a dual personality consisting of a distributed unit (DU) component making it possible to appear as a regular cell to the user equipment (UE) it serves, and a mobile terminal (MT) component inheriting many properties of a regular UE which connects to its donor parent node(s). The SMR can also be configured to be communicatively coupled from the base station to the UE for a control plane (CP) and a user plane (UP). Thus, SMR nodes can be configured so that packets traversing the link (backhaul link) between its donor base station and the MT component of the SMR are properly decoded and re-encoded for transmission to the UE on the access link.

The SMR can make use of side control information to enable a more intelligent amplify-and-forward operation in a system with TDD access and multi-beam operation. Such side control information can include beamforming information, timing information to align transmission/reception boundaries of the SMR, information on UL-DL TDD configuration, on-off information for efficient interference management and improved energy efficiency, as well as control information including power control information for efficient interference management. As such, various aspects include mechanisms to efficiently provide on-off information so that efficient interference management and improved energy efficiency goals can be achieved for the SMR. Thus, network energy savings can be obtained by powering down/off when there is no RF signal to amplify and powering back on when needed resulting from on-off information, which can control powering on or off, for example.

In an aspect, an SMR can include an SMR Mobile Termination (SMR-MT) component, an SMR base station (SMR-BS) component, and an SMR control unit (SMR-CU) component. The SMR-MT component is configured to terminate a backhaul link between the SMR and the base station and process data in a user-plane protocol layer. The SMR-BS component is configured to terminate an access link between the SMR and the UE and also process data in the user-plane protocol layer. The SMR-CU component is configured to receive the control information at a control-plane protocol layer and perform the on-off operations of the power saving or power control mechanism according to on-off information by activating/deactivating component carriers (CCs) or bandwidth parts (BWPs) on the backhaul link and the access link. Note that, hereinafter, 'power control' and 'power saving' can be used interchangeably throughout to refer to one and the same mechanism for operating on-off operations and associated aspects. To further accommodate legacy UEs, a default CC or a default BWP could be always activated, which is either implicitly determined or configured by the received control information.

FIG. 1 is an example network 100 according to one or more implementations described herein. Example network 100 can include UEs 110-1, 110-2, etc. (referred to collectively as "UEs 110" and individually as "UE 110"), a radio access network (RAN) 120, a core network (CN) 130, application servers 140, or external networks 150, and a smart repeater (SMR) 170.

The systems and devices of example network 100 may operate in accordance with one or more communication standards, such as 2nd generation (2G), 3rd generation (3G), 4th generation (4G) (e.g., long-term evolution (LTE)), and/or 5th generation (5G) (e.g., new radio (NR)) communication standards of the 3rd generation partnership project (3GPP). Additionally, or alternatively, one or more of the systems and devices of example network 100 may operate in accordance with other communication standards and protocols discussed herein, including future versions or generations of 3GPP standards (e.g., sixth generation (6G) standards, seventh generation (7G) standards, etc.), institute of electrical and electronics engineers (IEEE) standards (e.g., wireless metropolitan area network (WMAN), worldwide interoperability for microwave access (WiMAX), etc.), and more.

As shown, UEs 110 may include smartphones (e.g., handheld touchscreen mobile computing devices connectable to one or more wireless communication networks). Additionally, or alternatively, UEs 110 may include other types of mobile or non-mobile computing devices capable of wireless communications, such as personal data assistants (PDAs), pagers, laptop computers, desktop computers, wireless handsets, etc. In some implementations, UEs 110 may include internet of things (IoT) devices (or IoT UEs) that may comprise a network access layer designed for low-power IoT applications utilizing short-lived UE connections. Additionally, or alternatively, an IoT UE may utilize one or more types of technologies, such as machine-to-machine (M2M) communications or machine-type communications (MTC) (e.g., to exchanging data with an MTC server or other device via a public land mobile network (PLMN)), proximity-based service (ProSe) or device-to-device (D2D) communications, sensor networks, IoT networks, and more. Depending on the scenario, an M2M or MTC exchange of data may be a machine-initiated exchange, and an IoT network may include interconnecting IoT UEs (which may include uniquely identifiable embedded computing devices within an Internet infrastructure) with short-lived connections. In some scenarios, IoT UEs may execute background applications (e.g., keep-alive messages, status updates, etc.) to facilitate the connections of the IoT network.

UEs 110 may communicate and establish a connection with (e.g., be communicatively coupled) with RAN 120, which may involve one or more wireless channels 114-1 and 114-2, each of which may comprise a physical communications interface/layer. In some implementations, a UE may be configured with dual connectivity (DC) as a multi-radio access technology (multi-RAT) or multi-radio dual connectivity (MR-DC), where a multiple receive and transmit (Rx/Tx) capable UE may use resources provided by different network nodes (e.g., 122-1 and 122-2) that may be connected via non-ideal backhaul (e.g., where one network node provides NR access and the other network node provides either E-UTRA for LTE or NR access for 5G). In such a scenario, one network node may operate as a master node (MN) and the other as the secondary node (SN). The MN and SN may be connected via a network interface (e.g., interface 123), and at least the MN may be connected to the CN 130 (via interfaces 124, 126, 128). Additionally, at least one of the MN or the SN may be operated with shared spectrum channel access, and functions specified for UE 110 can be used for an integrated access and backhaul mobile termination (IAB-MT). Similar for UE 110, the IAB-MT may access the network using either one network node or using two different nodes with enhanced dual connectivity (EN-DC) architectures, new radio dual connectivity (NR-DC) architectures, or other direct connectivity such as a sidelink communication channel as an SL interface 112. In some implementations, a base station (as described herein) may be an example of network node 122.

As shown, UE 110 may also be communicatively coupled to SMR 170 via an access link 174 to obtain forwarded signals from the RAN 122 via a backhaul link 172. The SMR 170, for example, can also be based on a Layer 2 architecture with end-to-end packet data convergence protocol (PDCP) layer or other layer from the base station to the UE for control plane (CP) and user plane (UP). Thus, these nodes can be configured so that packets traversing a backhaul link 172 between its donor base station and a mobile terminal (MT) component of the SMR 170 itself is properly decoded and re-encoded for transmission to the UE on the access link 174.

As shown, UE 110 may also, or alternatively, connect to access point (AP) 116 via connection interface 118, which may include an air interface enabling UE 110 to communicatively couple with AP 116. AP 116 may comprise a wireless local area network (WLAN), WLAN node, WLAN termination point, etc. The connection 1207 may comprise a local wireless connection, such as a connection consistent with any IEEE 702.11 protocol, and AP 116 may comprise a wireless fidelity (Wi-Fi®) router or other AP. While not explicitly depicted in FIG. 1, AP 116 may be connected to another network (e.g., the Internet) without connecting to RAN 120 or CN 130. In some scenarios, UE 110, RAN 120, and AP 116 may be configured to utilize LTE-WLAN aggregation (LWA) techniques or LTE WLAN radio level integration with IPsec tunnel (LWIP) techniques. LWA may involve UE 110 in RRC_CONNECTED being configured by RAN 120 to utilize radio resources of LTE and WLAN. LWIP may involve UE 110 using WLAN radio resources (e.g., connection interface 118) via IPsec protocol tunneling to authenticate and encrypt packets (e.g., Internet Protocol (IP) packets) communicated via connection interface 118. IPsec tunneling may include encapsulating the entirety of original IP packets and adding a new packet header, thereby protecting the original header of the IP packets.

RAN 120 may include one or more RAN nodes 122-1 and 122-2 (referred to collectively as RAN nodes 122, and individually as RAN node 122) that enable channels 114-1 and 114-2 to be established between UEs 110 and RAN 120. RAN nodes 122 may include network access points configured to provide radio baseband functions for data and/or voice connectivity between users and the network based on one or more of the communication technologies described herein (e.g., 2G, 3G, 4G, 5G, WiFi, etc.). As examples therefore, a RAN node may be an E-UTRAN Node B (e.g., an enhanced Node B, eNodeB, eNB, 4G base station, etc.), a next generation base station (e.g., a 5G base station, NR base station, next generation eNBs (gNB), etc.). RAN nodes 122 may include a roadside unit (RSU), a transmission reception point (TRxP or TRP), and one or more other types of ground stations (e.g., terrestrial access points). In some scenarios, RAN node 122 may be a dedicated physical device, such as a macrocell base station, and/or a low power (LP) base station for providing femtocells, picocells or other like having smaller coverage areas, smaller user capacity, or higher bandwidth compared to macrocells.

Some or all of RAN nodes 122 may be implemented as one or more software entities running on server computers as part of a virtual network, which may be referred to as a centralized RAN (CRAN) and/or a virtual baseband unit pool (vBBUP). In these implementations, the CRAN or vBBUP may implement a RAN function split, such as a packet data convergence protocol (PDCP) split wherein radio resource control (RRC) and PDCP layers may be operated by the CRAN/vBBUP and other Layer 2 (L2) protocol entities may be operated by individual RAN nodes 122; a media access control (MAC)/physical (PHY) layer split wherein RRC, PDCP, radio link control (RLC), and MAC layers may be operated by the CRAN/vBBUP and the PHY layer may be operated by individual RAN nodes 122; or a "lower PHY" split wherein RRC, PDCP, RLC, MAC layers and upper portions of the PHY layer may be operated by the CRAN/vBBUP and lower portions of the PHY layer may be operated by individual RAN nodes 122. This virtualized framework may allow freed-up processor cores of RAN nodes 122 to perform or execute other virtualized applications.

In some implementations, an individual RAN node 122 may represent individual gNB-distributed units (DUs) connected to a gNB-control unit (CU) via individual F1 interfaces. In such implementations, the gNB-DUs may include one or more remote radio heads or radio frequency (RF) front end modules (RFEMs), and the gNB-CU may be operated by a server (not shown) located in RAN 120 or by a server pool (e.g., a group of servers configured to share resources) in a similar manner as the CRAN/vBBUP. Additionally, or alternatively, one or more of RAN nodes 122 may be next generation eNBs (i.e., gNBs) that may provide evolved universal terrestrial radio access (E-UTRA) user plane and control plane protocol terminations toward UEs 110, and that may be connected to a 5G core network (5GC) 130 via an NG interface.

Any of the RAN nodes 122 may terminate an air interface protocol and may be the first point of contact for UEs 110. In some implementations, any of the RAN nodes 122 may fulfill various logical functions for the RAN 120 including, but not limited to, radio network controller (RNC) functions such as radio bearer management, uplink and downlink dynamic radio resource management and data packet scheduling, and mobility management. UEs 110 may be configured to communicate using orthogonal frequency-division multiplexing (OFDM) communication signals with each other or with any of the RAN nodes 122 over a multicarrier communication channel in accordance with various communication techniques, such as, but not limited to, an OFDMA communication technique (e.g., for downlink communications) or a single carrier frequency-division multiple access (SC-FDMA) communication technique (e.g., for uplink and ProSe or sidelink (SL) communications), although the scope of such implementations may not be limited in this regard. The OFDM signals may comprise a plurality of orthogonal subcarriers.

In some implementations, a downlink resource grid may be used for downlink transmissions from any of the RAN nodes 122 to UEs 110, and uplink transmissions may utilize similar techniques. The grid may be a time-frequency grid (e.g., a resource grid or time-frequency resource grid) that represents the physical resource for downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises resource blocks, which describe the mapping of certain physical channels to resource elements. Each resource block may comprise a collection of resource elements (REs); in the frequency domain, this may represent the smallest quantity of resources that currently may be allocated. There are several different physical downlink channels that are conveyed using such resource blocks.

Further, RAN nodes 122 may be configured to wirelessly communicate with UEs 110, and/or one another, over a licensed medium (also referred to as the "licensed spectrum" and/or the "licensed band"), an unlicensed shared medium (also referred to as the "unlicensed spectrum" and/or the "unlicensed band"), or combination thereof. A licensed spectrum may include channels that operate in the frequency range of approximately 400 MHz to approximately 3.8 GHZ, whereas the unlicensed spectrum may include the 5 GHz band or higher, for example. A licensed spectrum may correspond to channels or frequency bands selected, reserved, regulated, etc., for certain types of wireless activity (e.g., wireless telecommunication network activity), whereas an unlicensed spectrum may correspond to one or more frequency bands that are not restricted for certain types of wireless activity. Whether a particular frequency band corresponds to a licensed medium or an unlicensed medium may depend on one or more factors, such as frequency allocations determined by a public-sector organization (e.g., a government agency, regulatory body, etc.) or frequency allocations determined by a private-sector organization involved in developing wireless communication standards and protocols, etc.

To operate in the unlicensed spectrum, UEs 110 and the RAN nodes 122 may operate using licensed assisted access (LAA), eLAA, and/or feLAA mechanisms. In these implementations, UEs 110 and the RAN nodes 122 may perform one or more known medium-sensing operations or carrier-sensing operations in order to determine whether one or more channels in the unlicensed spectrum is unavailable or otherwise occupied prior to transmitting in the unlicensed spectrum. The medium/carrier sensing operations may be performed according to a listen-before-talk (LBT) protocol.

The LAA mechanisms may be built upon carrier aggregation (CA) technologies. In CA, each aggregated carrier is referred to as a component carrier (CC). In some cases, individual CCs may have a different bandwidth than other CCs. In time division duplex (TDD) systems, the number of CCs as well as the bandwidths of each CC may be the same for DL and UL. CA also comprises individual serving cells to provide individual CCs. The coverage of the serving cells may differ, for example, because CCs on different frequency bands will experience different path loss. A primary service cell or PCell may provide a primary component carrier (PCC) for both UL and DL and may handle RRC and non-access stratum (NAS) related activities. The other serving cells are referred to as SCells, and each SCell may provide an individual secondary component carrier (SCC) for both UL and DL. The SCCs may be added and removed as required, while changing the PCC may require UE 110 to undergo a handover. In LAA, eLAA, and feLAA, some or all of the SCells may operate in the unlicensed spectrum (referred to as "LAA SCells"), and the LAA SCells are assisted by a PCell operating in the licensed spectrum. When a UE is configured with more than one LAA SCell, the UE may receive UL grants on the configured LAA SCells indicating different PUSCH starting positions within a same subframe.

The PDSCH may carry user data and higher layer signaling to UEs 110. The physical downlink control channel (PDCCH) may carry information about the transport format and resource allocations related to the PDSCH channel, among other things. The PDCCH may also inform UEs 110 about the transport format, resource allocation, and hybrid automatic repeat request (HARQ) information related to the uplink shared channel. Typically, downlink scheduling (e.g., assigning control and shared channel resource blocks to UE 110-2 within a cell) may be performed at any of the RAN nodes 122 based on channel quality information fed back from any of UEs 110. The downlink resource assignment information may be sent on the PDCCH used for (e.g., assigned to) each of UEs 110.

The PDCCH uses control channel elements (CCEs) to convey the control information, wherein a number of CCEs (e.g., 6 or the like) may consists of a resource element groups (REGs), where a REG is defined as a physical resource block (PRB) in an OFDM symbol. Before being mapped to resource elements, the PDCCH complex-valued symbols may first be organized into quadruplets, which may then be permuted using a sub-block interleaver for rate matching, for example. Each PDCCH may be transmitted using one or more of these CCEs, where each CCE may correspond to nine sets of four physical resource elements known as REGs. Four quadrature phase shift keying (QPSK) symbols may be mapped to each REG. The PDCCH may be transmitted using one or more CCEs, depending on the size of the DCI and the channel condition. There may be four or more different PDCCH formats with different numbers of CCEs (e.g., aggregation level, L=1, 2, 4, 8, or 16).

Some implementations may use concepts for resource allocation for control channel information that are an extension of the above-described concepts. For example, some implementations may utilize an extended (E)-PDCCH that uses PDSCH resources for control information transmission. The EPDCCH may be transmitted using one or more ECCEs. Similar to the above, each ECCE may correspond to nine sets of four physical resource elements known as EREGs. An ECCE may have other numbers of EREGs in some situations.

The RAN nodes 122 can be also connected or communicatively coupled to CN 130 via a Next Generation (NG) interface as interface 124. The NG interface 124 can be split into two parts, a Next Generation (NG) user plane (NG-U) interface 126, which carries traffic data between the RAN nodes 122 and a User Plane Function (UPF), and the S1 control plane (NG-C) interface 128, which is a signaling interface between the RAN nodes 122 and Access and Mobility Management Functions (AMFs).

The RAN nodes 122 may be configured to communicate with one another via interface 123. In implementations where the system is an LTE system, interface 123 may be an X2 interface. In LTE networks, X2 and S1 interface are defined as the interfaces between RAN nodes and between RAN and Core Network. 5G may operate in two modes as non-standalone and standalone mode. For non-standalone operation the specification defines the extension for S1 and X2 interfaces as for standalone operation as X2/Xn for the interface between RAN nodes 122 and S1/NG for the interface 124 between RAN 120 and CN 130. The interface 124 may be defined between two or more RAN nodes 122 (e.g., two or more eNBs/gNBs or a combination thereof) that connect to evolved packet core (EPC), the CN 130, or between eNBs connecting to an EPC. In some implementations, the X2/Xn interface may include an X2/Xn user plane interface (X2-U/Xn-U) and an X2 control plane interface (X2-C/Xn-C). The X2-U/Xn-U may provide flow control mechanisms for user data packets transferred over the X2/Xn interface and may be used to communicate information about the delivery of user data between eNBs or gNBs. For example, the X2-U/Xn-U may provide specific sequence number information for user data transferred from a master eNB (MeNB) to a secondary eNB (SeNB); information about successful in sequence delivery of PDCP packet data units (PDUs) to a UE 110 from an SeNB for user data; information of PDCP PDUs that were not delivered to a UE 110; information about a current minimum desired buffer size at the SeNB for transmitting to the UE user data; and the like. The X2-C/Xn-C may provide intra-LTE access mobility functionality (e.g., including context transfers from source to target eNBs, user plane transport control, etc.), load management functionality, and inter-cell interference coordination functionality.

As shown, RAN 120 may be connected (e.g., communicatively coupled) to CN 130. CN 130 may comprise a plurality of network elements 132, which are configured to offer various data and telecommunications services to customers/subscribers (e.g., users of UEs 110) who are connected to the CN 130 via the RAN 120. In some implementations, CN 130 may include an evolved packet core (EPC), a 5G CN, and/or one or more additional or alternative types of CNs. The components of the CN 130 may be implemented in one physical node or separate physical nodes including components to read and execute instructions from a machine-readable or computer-readable medium (e.g., a non-transitory machine-readable storage medium). In some implementations, network function virtualization (NFV) may be utilized to virtualize any or all the above-described network node roles or functions via executable instructions stored in one or more computer-readable storage mediums (described in further detail below). A logical instantiation of the CN 130 may be referred to as a network slice, and a logical instantiation of a portion of the CN 130 may be referred to as a network sub-slice. Network Function Virtualization (NFV) architectures and infrastructures may be used to virtualize one or more network functions, alternatively performed by proprietary hardware, onto physical resources comprising a combination of industry-standard server hardware, storage hardware, or switches. In other words, NFV systems may be used to execute virtual or reconfigurable implementations of one or more EPC components/functions.

As shown, CN 130, application servers 140, and external networks 150 may be connected to one another via interfaces 134, 136, and 138, which may include IP network interfaces. Application servers 140 may include one or more server devices or network elements (e.g., virtual network functions (VNFs) offering applications that use IP bearer resources with CN 130 (e.g., universal mobile telecommunications system packet services (UMTS PS) domain, LTE PS data services, etc.). Application servers 140 may also, or alternatively, be configured to support one or more communication services (e.g., voice over IP (VOIP sessions, push-to-talk (PTT) sessions, group communication sessions, social networking services, etc.) for UEs 110 via the CN 130. Similarly, external networks 150 may include one or more of a variety of networks, including the Internet, thereby providing the mobile communication network and UEs 110 of the network access to a variety of additional services, information, interconnectivity, and other network features.

Figure 2:
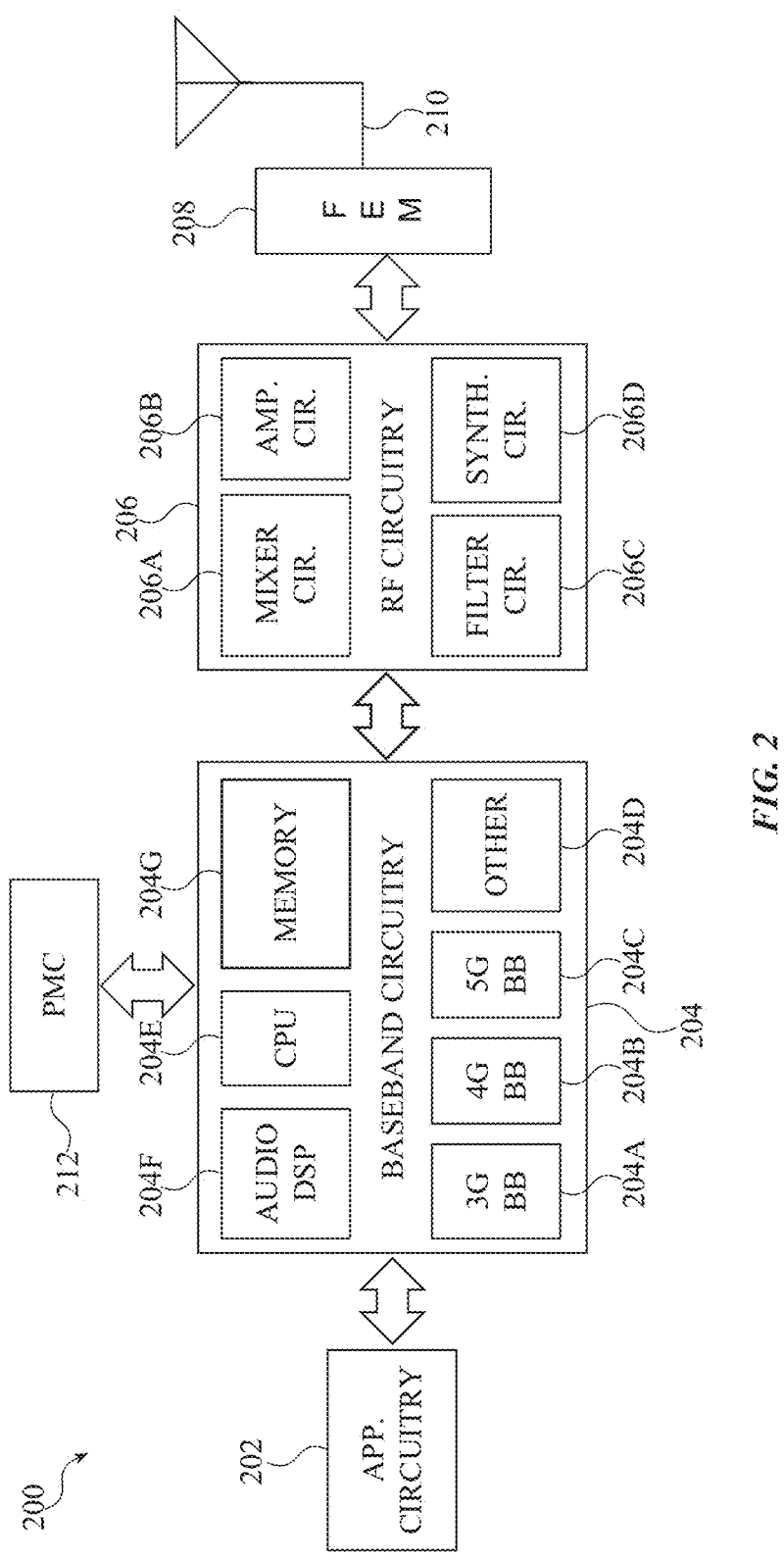
FIG. 2 illustrates a diagram illustrating example components of a device that can be employed in accordance with various aspects discussed herein.

FIG. 2 illustrates example components of a device 200 in accordance with some aspects. In some aspects, the device 200 can be a UE, an SMR or a base station. The device 200 can also include application circuitry 202, baseband circuitry 204, Radio Frequency (RF) circuitry 206, front-end module (FEM) circuitry 208, one or more antennas 210, and power management circuitry (PMC) 212 coupled together at least as shown. The components of the illustrated device 200 can be included in a UE, an SMR, or a RAN node. In some aspects, the device 200 can include fewer elements (e.g., a RAN node cannot utilize application circuitry 202, and instead include a processor/controller to process IP data received from a CN such as 5GC 120 or an Evolved Packet Core (EPC)). In some aspects, the device 200 can include additional elements such as, for example, memory/storage, display, camera, sensor (including one or more temperature sensors, such as a single temperature sensor, a plurality of temperature sensors at different locations in device 200, etc.), or input/output (I/O) interface. In other aspects, the components described below can be included in more than one device (e.g., said circuitries can be separately included in more than one device for Cloud-RAN (C-RAN) implementations).

The application circuitry 202 can include one or more application processors. For example, the application circuitry 202 can include circuitry such as, but not limited to, one or more single-core or multi-core processors. The processor(s) can include any combination of general-purpose processors and dedicated processors (e.g., graphics processors, application processors, etc.). The processors can be coupled with or can include memory/storage and can be configured to execute instructions stored in the memory/storage to enable various applications or operating systems to run on the device 200. In some aspects, processors of application circuitry 202 can process IP data packets received from an EPC.

The baseband circuitry 204 can include circuitry such as, but not limited to, one or more single-core or multi-core processors. The baseband circuitry 204 can include one or more baseband processors or control logic to process baseband signals received from a receive signal path of the RF circuitry 206 and to generate baseband signals for a transmit signal path of the RF circuitry 206. Baseband circuitry 204 can interface with the application circuitry 202 for generation and processing of the baseband signals and for controlling operations of the RF circuitry 206. For example, in some aspects, the baseband circuitry 204 can include a third generation (3G) baseband processor 204A, a fourth generation (4G) baseband processor 204B, a fifth generation (5G) baseband processor 204C, or other baseband processor(s) 204D for other existing generations, generations in development or to be developed in the future (e.g., second generation (2G), sixth generation (6G), etc.). The baseband circuitry 204 (e.g., one or more of baseband processors 204A-D) can handle various radio control functions that enable communication with one or more radio networks via the RF circuitry 206. In other aspects, some, or all of the functionality of baseband processors 204A-D can be included in modules stored in the memory 204G and executed via a Central Processing Unit 204E. Memory 204G can include executable components or instructions to cause one or more processors (e.g., baseband circuitry 204) to perform aspects, processes or operations herein. The radio control functions can include, but are not limited to, signal modulation/demodulation, encoding/decoding, radio frequency shifting, etc. In some aspects, modulation/demodulation circuitry of the baseband circuitry 204 can include Fast-Fourier Transform (FFT), precoding, or constellation mapping/demapping functionality. In some aspects, encoding/decoding circuitry of the baseband circuitry 204 can include convolution, tail-biting convolution, turbo, Viterbi, or Low Density Parity Check (LDPC) encoder/decoder functionality. Aspects of modulation/demodulation and encoder/decoder functionality are not limited to these examples and can include other suitable functionality in other aspects.

In some aspects, the baseband circuitry 204 can include one or more audio digital signal processor(s) (DSP) 204F. The audio DSP(s) 204F can include elements for compression/decompression and echo cancellation and can include other suitable processing elements in other aspects. Components of the baseband circuitry can be suitably combined in a single chip, a single chipset, or disposed on a same circuit board in some aspects. In some aspects, some, or all of the constituent components of the baseband circuitry 204 and the application circuitry 202 can be implemented together such as, for example, on a system on a chip (SOC).

In some aspects, the baseband circuitry 204 can provide for communication compatible with one or more radio technologies. For example, in some aspects, the baseband circuitry 204 can support communication with a NG-RAN, an evolved universal terrestrial radio access network (EU-TRAN) or other wireless metropolitan area networks (WMAN), a wireless local area network (WLAN), a wireless personal area network (WPAN), etc. Aspects in which the baseband circuitry 204 is configured to support radio communications of more than one wireless protocol can be referred to as multi-mode baseband circuitry.

RF circuitry 206 can enable communication with wireless networks using modulated electromagnetic radiation through a non-solid medium. In various aspects, the RF circuitry 206 can include switches, filters, amplifiers, etc. to facilitate the communication with the wireless network. RF circuitry 206 can include a receive signal path which can include circuitry to down-convert RF signals received from the FEM circuitry 208 and provide baseband signals to the baseband circuitry 204. RF circuitry 206 can also include a transmit signal path which can include circuitry to up-convert baseband signals provided by the baseband circuitry 204 and provide RF output signals to the FEM circuitry 208 for transmission.

In some aspects, the receive signal path of the RF circuitry 206 can include mixer circuitry 206a, amplifier circuitry 206b and filter circuitry 206c. In some aspects, the transmit signal path of the RF circuitry 206 can include filter circuitry 206c and mixer circuitry 206a. RF circuitry 206 can also include synthesizer circuitry 206d for synthesizing a frequency for use by the mixer circuitry 206a of the receive signal path and the transmit signal path. In some aspects, the mixer circuitry 206a of the receive signal path can be configured to down-convert RF signals received from the FEM circuitry 208 based on the synthesized frequency provided by synthesizer circuitry 206d. The amplifier circuitry 206b can be configured to amplify the down-converted signals and the filter circuitry 206c can be a low-pass filter (LPF) or band-pass filter (BPF) configured to remove unwanted signals from the down-converted signals to generate output baseband signals. Output baseband signals can be provided to the baseband circuitry 204 for further processing. In some aspects, the output baseband signals can be zero-frequency baseband signals, although this is not a requirement. In some aspects, mixer circuitry 206a of the receive signal path can comprise passive mixers, although the scope of the aspects is not limited in this respect.

In some aspects, the mixer circuitry 206a of the transmit signal path can be configured to up-convert input baseband signals based on the synthesized frequency provided by the synthesizer circuitry 206d to generate RF output signals for the FEM circuitry 208. The baseband signals can be provided by the baseband circuitry 204 and can be filtered by filter circuitry 206c.

In some aspects, the mixer circuitry 206a of the receive signal path and the mixer circuitry 206a of the transmit signal path can include two or more mixers and can be arranged for quadrature downconversion and upconversion, respectively. In some aspects, the mixer circuitry 206a of the receive signal path and the mixer circuitry 206a of the transmit signal path can include two or more mixers and can be arranged for image rejection (e.g., Hartley image rejection). In some aspects, the mixer circuitry 206a of the receive signal path and the mixer circuitry 206a can be arranged for direct downconversion and direct upconversion, respectively. In some aspects, the mixer circuitry 206a of the receive signal path and the mixer circuitry 206a of the transmit signal path can be configured for super-heterodyne operation.

In some aspects, the output baseband signals and the input baseband signals can be analog baseband signals, although the scope of the aspects is not limited in this respect. In some alternate aspects, the output baseband signals and the input baseband signals can be digital baseband signals. In these alternate aspects, the RF circuitry 206 can include analog-to-digital converter (ADC) and digital-to-analog converter (DAC) circuitry and the baseband circuitry 204 can include a digital baseband interface to communicate with the RF circuitry 206.

In some dual-mode aspects, a separate radio IC circuitry can be provided for processing signals for each spectrum, although the scope of the aspects is not limited in this respect.

In some aspects, the synthesizer circuitry 206d can be a fractional-N synthesizer or a fractional N/N+1 synthesizer, although the scope of the aspects is not limited in this respect as other types of frequency synthesizers can be suitable. For example, synthesizer circuitry 206d can be a delta-sigma synthesizer, a frequency multiplier, or a synthesizer comprising a phase-locked loop with a frequency divider.

The synthesizer circuitry 206d can be configured to synthesize an output frequency for use by the mixer circuitry 206a of the RF circuitry 206 based on a frequency input and a divider control input. In some aspects, the synthesizer circuitry 206d can be a fractional N/N+1 synthesizer.

In some aspects, frequency input can be provided by a voltage controlled oscillator (VCO), although that is not a requirement. Divider control input can be provided by either the baseband circuitry 204 or the application circuitry 202 depending on the desired output frequency. In some aspects, a divider control input (e.g., N) can be determined from a look-up table based on a channel indicated by the application circuitry 202.

Synthesizer circuitry 206d of the RF circuitry 206 can include a divider, a delay-locked loop (DLL), a multiplexer and a phase accumulator. In some aspects, the divider can be a dual modulus divider (DMD) and the phase accumulator can be a digital phase accumulator (DPA). In some aspects, the DMD can be configured to divide the input signal by either N or N+1 (e.g., based on a carry out) to provide a fractional division ratio. In some example aspects, the DLL can include a set of cascaded, tunable, delay elements, a phase detector, a charge pump and a D-type flip-flop. In these aspects, the delay elements can be configured to break a VCO period up into Nd equal packets of phase, where Nd is the number of delay elements in the delay line. In this way, the DLL provides negative feedback to help ensure that the total delay through the delay line is one VCO cycle.

In some aspects, synthesizer circuitry 206*d* can be configured to generate a carrier frequency as the output frequency, while in other aspects, the output frequency can be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some aspects, the output frequency can be a LO frequency (fLO). In some aspects, the RF circuitry 206 can include an IQ/polar converter.

FEM circuitry 208 can include a receive signal path which can include circuitry configured to operate on RF signals received from one or more antennas 210, amplify the received signals and provide the amplified versions of the received signals to the RF circuitry 206 for further processing. FEM circuitry 208 can also include a transmit signal path which can include circuitry configured to amplify signals for transmission provided by the RF circuitry 206 for transmission by one or more of the one or more antennas 210. In various aspects, the amplification through transmit or receive signal paths can be done solely in the RF circuitry 206, solely in the FEM circuitry 208, or in both the RF circuitry 206 and the FEM circuitry 208.

In some aspects, the FEM circuitry 208 can include a TX/RX switch to switch between transmit mode and receive mode operation. The FEM circuitry can include a receive signal path and a transmit signal path. The receive signal path of the FEM circuitry can include an LNA to amplify received RF signals and provide the amplified received RF signals as an output (e.g., to the RF circuitry 206). The transmit signal path of the FEM circuitry 208 can include a power amplifier (PA) to amplify input RF signals (e.g., provided by RF circuitry 206), and one or more filters to generate RF signals for subsequent transmission (e.g., by one or more of the one or more antennas 210).

In some aspects, the PMC 212 can manage power provided to the baseband circuitry 204. In particular, the PMC 212 can control power-source selection, voltage scaling, battery charging, or DC-to-DC conversion. The PMC 212 can often be included when the device 200 is capable of being powered by a battery, for example, when the device is included in a UE. The PMC 212 can increase the power conversion efficiency while providing desirable implementation size and heat dissipation characteristics.

While FIG. 2 shows the PMC 212 coupled only with the baseband circuitry 204. However, in other aspects, the PMC 212 can be additionally or alternatively coupled with, and perform similar power management operations for, other components such as, but not limited to, application circuitry 202, RF circuitry 206, or FEM circuitry 208.

In some aspects, the PMC 212 can control, or otherwise be part of, various power saving/power control mechanisms of the device 200. For example, if the device 200 is in an RRC_Connected state, where it is still connected to the RAN node as it expects to receive traffic shortly, then it can enter a state known as Discontinuous Reception Mode (DRX) after a period of inactivity. During this state, the device 200 can power down for brief intervals of time and thus save power.

If there is no data traffic activity for an extended period of time, then the device 200 can transition off to an RRC_Idle state, where it disconnects from the network and does not perform operations such as channel quality feedback, handover, etc. The device 200 goes into a very low power state and it performs paging where again it periodically wakes up to listen to the network and then powers down again. The device 200 cannot receive data in this state; in order to receive data, it can transition back to RRC_Connected state.

An additional power saving mode can allow a device to be unavailable to the network for periods longer than a paging interval (ranging from seconds to a few hours). During this time, the device is totally unreachable to the network and can power down completely. Any data sent during this time incurs a large delay and it is assumed the delay is acceptable.

Processors of the application circuitry 202 and processors of the baseband circuitry 204 can be used to execute elements of one or more instances of a protocol stack. For example, processors of the baseband circuitry 204, alone or in combination, can be used to execute Layer 3 (L3), Layer 2 (L2), or Layer 1 (L1) functionality, while processors of the application circuitry 202 can utilize data (e.g., packet data) received from these layers and further execute Layer 4 functionality (e.g., transmission communication protocol (TCP) and user datagram protocol (UDP) layers). As referred to herein, Layer 3 can comprise a radio resource control (RRC) layer, described in further detail below. As referred to herein, Layer 2 can comprise a medium access control (MAC) layer, a radio link control (RLC) layer, and a packet data convergence protocol (PDCP) layer, described in further detail below. As referred to herein, Layer 1 can comprise a physical (PHY) layer of a UE/RAN node.

Processors of the application circuitry 202, processors of the baseband circuitry 204, or processors of the RF circuitry 206 or other processor can be configured to include a memory and processing circuitry to generate control information associated with a smart repeater (SMR) to amplify and forward communications based on a power control mechanism by adapting one or more bandwidths over at least one of: a backhaul link or an access link based on the control information, wherein the control information comprises at least one of: a component carrier (CC) index or a bandwidth part (BWP) identifier (ID), a set of parameters to configure on-off operations of the one or more bandwidths, or a combination thereof. The processor(s) can then transmit the control information to the SMR. Alternatively, or additionally, the processor(s) can receive communications forwarded from a smart repeater, and process the communication by adapting one or more bandwidths based on control information associated with a power control mechanism from a base station and over an access link from a smart repeater (SMR); the control information comprises at least one of: a component carrier (CC) index or a bandwidth part (BWP) identifier (ID), a set of parameters associated with on-off operations of the one or more bandwidths, or a combination of thereof, for example.

Figure 3:
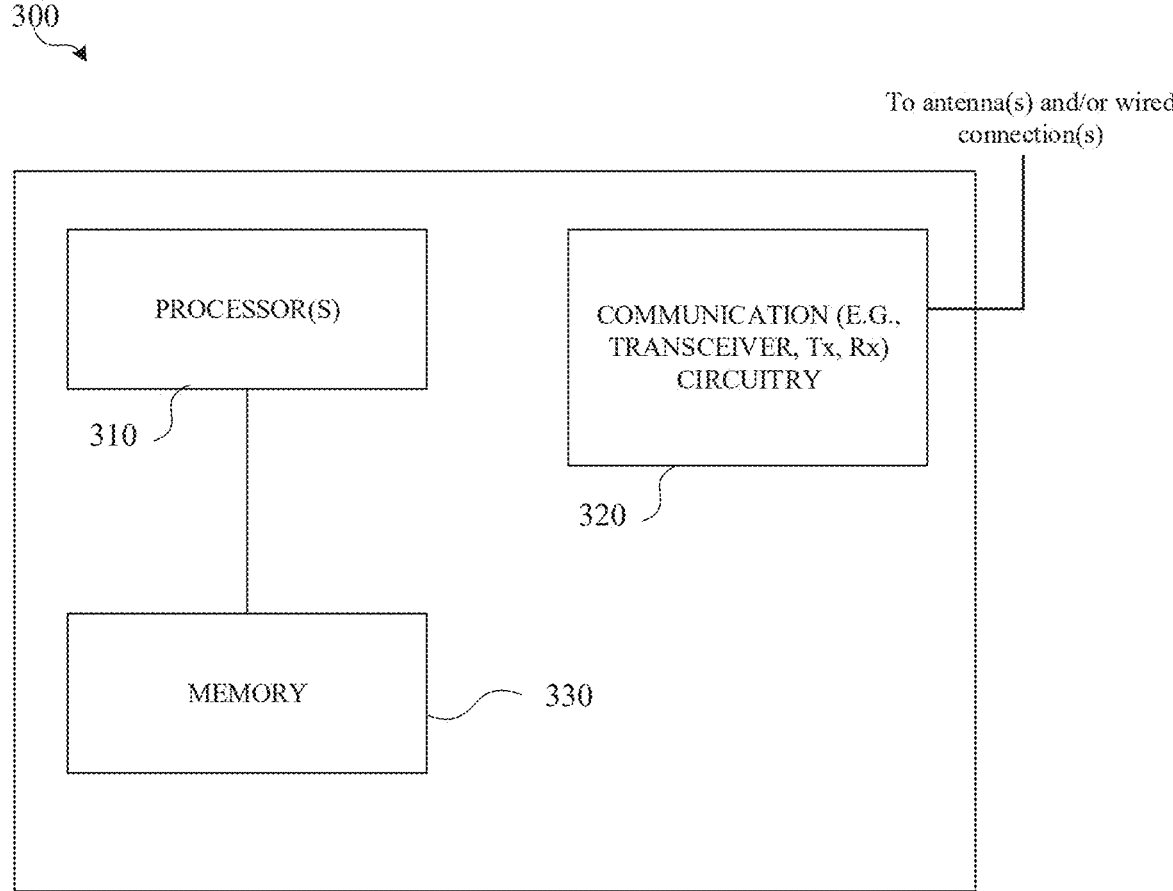
FIG. 3 illustrates an example simplified block diagram of a user equipment (UE) wireless communication device or other network device/component (e.g., an SMR, eNB, or gNB) in accordance with various aspects.

Referring to FIG. 3, illustrated is a block diagram of a user equipment (UE) device or another network device/component 300 (e.g., an SMR, V-UE/P-UE, IoT, gNB, eNB, or other participating network entity/component). The device 300 includes one or more processors 310 (e.g., one or more baseband processors) comprising processing circuitry and associated interface(s), transceiver circuitry 320 (e.g., comprising RF circuitry, which can comprise transmitter circuitry (e.g., associated with one or more transmit chains) and/or receiver circuitry (e.g., associated with one or more receive chains) that can employ common circuit elements, distinct circuit elements, or a combination thereof), and a memory 330 (which can comprise any of a variety of storage mediums and can store instructions and/or data associated with one or more of processor(s) 310 or transceiver circuitry 320).

Memory 330 (as well as other memory components discussed herein, e.g., memory, data storage, or the like) can comprise one or more machine-readable medium/media including instructions that, when performed by a machine or component herein cause the machine or other device to perform acts of a method, an apparatus or system for communication using multiple communication technologies according to aspects, embodiments and examples described herein. It is to be understood that aspects described herein can be implemented by hardware, software, firmware, or any combination thereof. When implemented in software, functions can be stored on or transmitted over as one or more instructions or code on a computer-readable medium (e.g., the memory described herein or other storage device). Computer-readable media includes both computer storage media and communication media including any medium that facilitates transfer of a computer program from one place to another. A storage media or a computer readable storage device can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or other tangible and/or non-transitory medium, that can be used to carry or store desired information or executable instructions.

In an aspect, the UE. gNB device or another network device/component (e.g., an SMR, V-UE/P-UE, IoT, gNB, eNB, or other participating network entity/component) 300 can operate to configure by processing/generating/encoding/decoding a physical (PHY) layer transmission to/from a higher layer (e.g., MAC layer), comprising multiple different transport blocks (TBs) based on an unequal protection between the different TBs in a physical layer encapsulation (e.g., EPC packets, a transmission opportunity, MCOT, a single transmission burst, a TTI or other encapsulation protocol or related encapsulation parameter(s) for the encapsulation of data from higher layers into frames for transmission over the air. The physical (PHY) layer transmission can be received, transmitted, or provide (d) with communication/transmitter circuitry 320 to similarly process/generate the physical layer transmission with spatial layers via a physical channel in an NR network or other networks.

Processor(s) 310 can be components of application/processing circuitry or processor(s) of the baseband circuitry that can be used to execute components or elements of one or more instances of a protocol stack. For example, processor(s) 310 of baseband circuitry, alone or in combination, as processing circuitry, can be configured, in an aspect, to receive side control information for managing on-off (activation/deactivation) operations based on different component carriers (CCs) or bandwidth parts (BWPs) of a bandwidth. Memory 330 can include executable instructions, and be integrated in, or communicatively coupled to, processor or processing circuitry 310. The executable instructions of the memory 230 can cause processing circuitry 310 to receive/transmit communications forwarded from or to a smart repeater. The processing circuitry 310 can process the communication by adapting one or more bandwidths based on control information associated with a power control mechanism from a base station and over an access link from a smart repeater (SMR), wherein the control information comprises at least one of: a component carrier (CC) index or a bandwidth part (BWP) identifier (ID), a set of parameters associated with on-off operations of the one or more bandwidths, or a combination of thereof.

The device 300 is configured to process, perform, generate, communicate or cause execution of any one or more combined aspects described herein or in association with any of the FIG. 1 thru 13.

Figure 4:
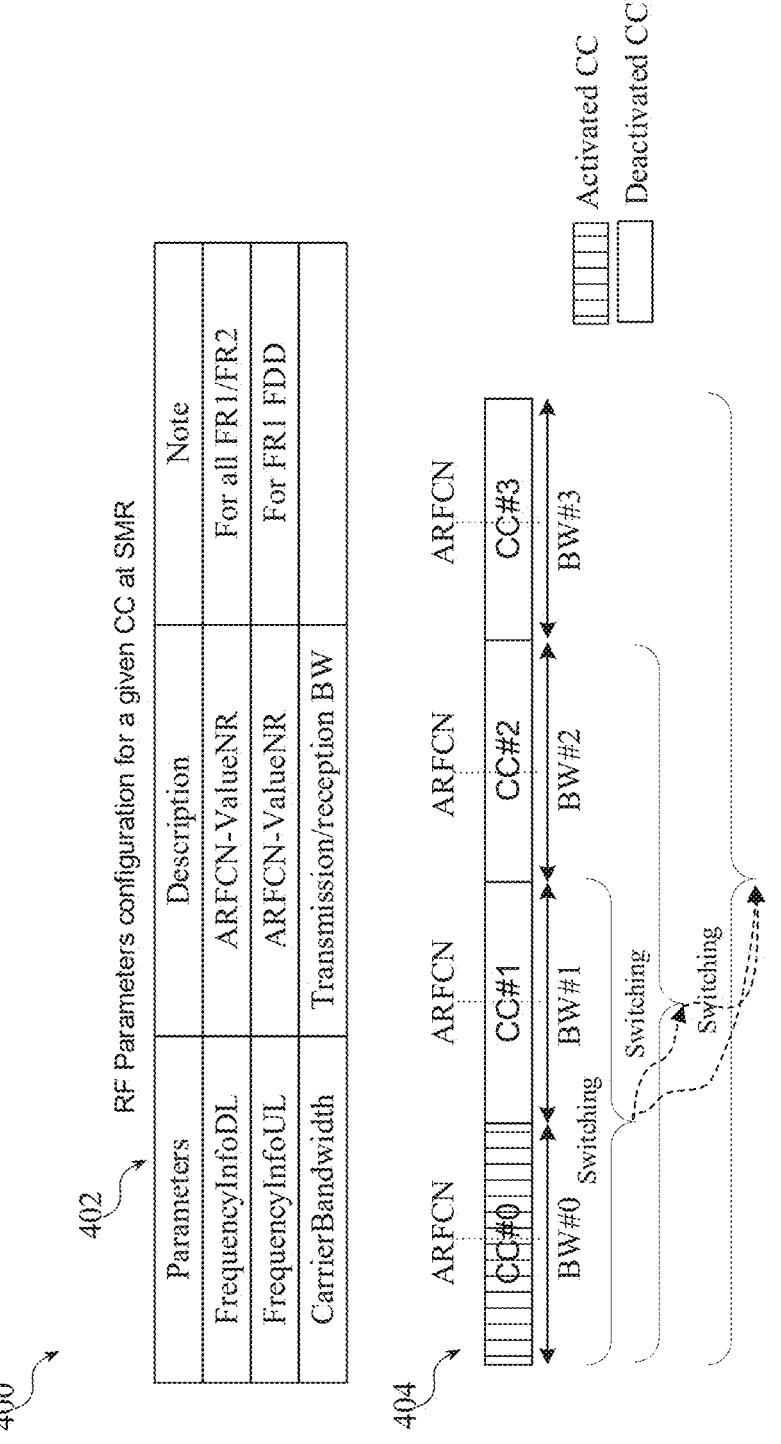
FIG. 4 illustrates an example component carrier (CC) based approach for a power control mechanism in accordance with various aspects.

To achieve the efficient interference management and improved energy efficiency goals for SMR operation, various solutions including CC-based and BWP-based power control mechanisms are described in further detail below. FIG. 4 illustrates an example 400 of configuration parameters 402 and a CC based power control mechanism 404 for relay in an SMR in accordance with various aspects herein. Various RF parameters can be received and configured at SMR 170 as illustrated, for example, at parameter configuration table 402. The parameters 402 can be received in a side control information, or a control information that is indirectly related to data communication, but enhances the efficiency of data communication as a side effect, for example. The parameters can comprise a carrier bandwidth or a bandwidth for a center frequency that is for transmission/reception in one or more bandwidths. The parameters can include frequency information for downlink (DL) (FrequencyInfoDL), and a frequency information for uplink (UL) (FrequencyInfoUL) that may be independent and different from one another based on an associated absolute radio frequency channel number (ARFCN) value for new radio NR (ARFCN-ValueNR). The frequency information for DL can be for all frequency ranges, including frequency range (FR) 1 as well as FR2, while the frequency information for UL can be associated with FR1 frequency division duplexing (FDD) operation only or both FR1 and FR2 or FR2 only, for example.

Control information can be received at the SMR 170 in order to trigger on-off operations for a power control mechanism. The SMR 170 can configure a CC-based power control mechanism or a BWP-based power control mechanism. A CC-based power control mechanism 404 is illustrated for example. The SMR 170 can be configured with various bandwidths by which to enable sufficient on-off operations and adapt bandwidths for saving power based on received control information via the base station 120 over backhaul link 172.

In one aspect, a CC-based power control mechanism can be triggered in response to one or more CC indices being received in the side control information along with one or more of parameters 402. When CC-based power control mechanisms are configured, the SMR 170 can amplify and forward data in communication with the UE 110 or the base station 120 by aggregating different CCs with different bandwidth and frequencies. For example, according to the control information received, four CCs (CC #0 through CC #3) can be configured with different bandwidths (BW #0 through BW #3) respectively. Based on the side control information, a CC (e.g., CC #0) can be activated or on, while other CCs are deactivated or off. In response to the side control information, a CC state switching can occur from the activated state to the deactivated state and vice versa, such that the deactivated CC of SMR becomes activated and the activated CC of SMR become deactivated in CC switching. The CC state switching can include a single CC or more than one CCs (e.g., CC #0 and CC #1) or include different bandwidths of the SMR. Different CCs can be configured for UL and DL based on the control information (e.g., a CC index, or other parameters). As such, the SMR 170, instead of performing on-off operations of a whole RF frequency bandwidth, a finer granularity to control the power can be achieved based on the side control information with the CC-level or BWP-level On-Off operations in the frequency bandwidth of the SMR.

In an aspect, various RF BW configurations can be utilized for the first CC-based power control mechanism. For example, when multiple CCs are configured the on-off operations would not have off all the CCs simultaneously because a legacy UE may be associated with the SMR 170, which may still require data to be relayed and the legacy UE does not know whether it is associated with the SMR 170 or the gNB 120 and therefore gNB 120 at least needs to keep some link available or activated for legacy UEs. To support this, at least one CC may be determined to be Default CC for SMR, which is termed as 'SMR-DCC' hereinafter. The SMR-DCC is always be activated and not impacted by the CC-based power control mechanism. For example, the SMR-DCC can be explicitly configured by the RRC signaling by the gNB.

Alternatively, or additionally, the SMR-DCC can be implicitly determined by the SMR 170. For example, the SMR 170 can determine the SMR-DCC based on a lowest CC index from CC indices received in the control information. Alternatively, the CC designated as the SMR-DCC can be the CC that the SMR successfully performs a cell search operation. Thus, this can be a primary CC and served as the SMR-DCC in carrier aggregation by the SMR 170. The SMR 170 can thus receive and transmit data on the primary CC in case of a single carrier and perform carrier aggregation, based on the received control information, by utilizing one or more other CCs in addition to the primary CC to support wider transmission bandwidth, for example.

Figure 5:
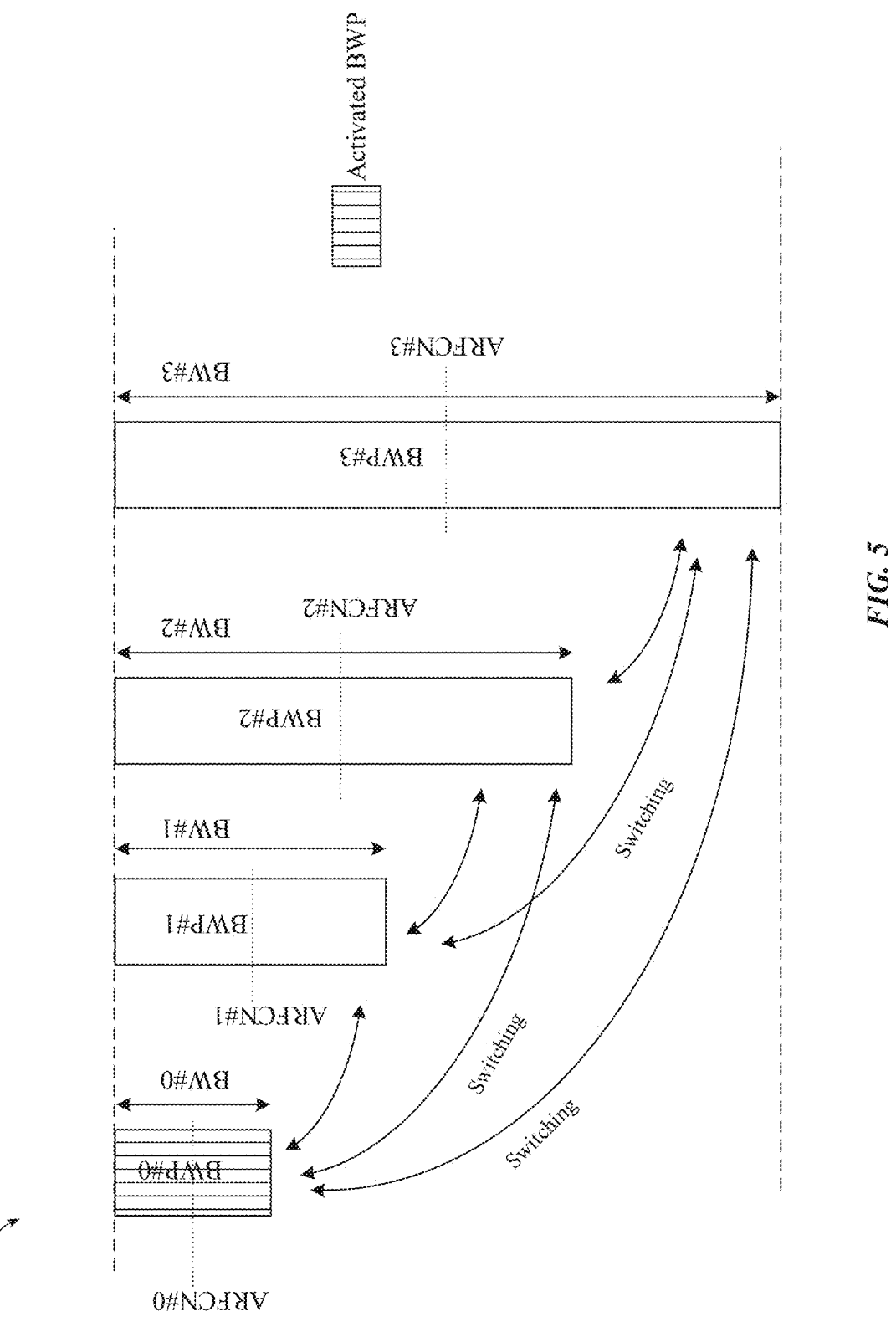
FIG. 5 illustrates an example bandwidth part (BWP) based approach for a power control mechanism in accordance with various aspects.

FIG. 5 illustrates an example of bandwidth part (BWP) based power control mechanisms 500 in accordance with various aspects herein. A finer granularity of on-off operations can be configured with a BWP-based mechanism in response to receiving a BWP identifier (ID) or index in the control information along with one or more parameters. Each BWP identifier can be associated with its ARFCN-valueNR for UL or DL and a bandwidth. A single bandwidth rather than multiple bandwidths can be configured for forwarding data while allowing some BWPs within the single RF bandwidth to be deactivating and one or more others are activated. As such, BWPs can be configured for SMR 170 with each BWP being associated with a BWP ID and other RF parameters such as an ARFCN for power on-off operations. A benefit compared to the CC-based approach illustrated in FIG. 4 is that a single RF bandwidth can still be configured for a given SMR 170 for the implementation together with a finer granularity of power control by configuring the BWPs and then enabling power control mechanism on a per BWP basis to the SMR 170.

As illustrated, BWP #0 can be activated while other BWPs (e.g., BWP #1 thru BWP #3) can be deactivated. Based on the received control information which is determined based on the network conditions and traffic demand by the gNB, the SMR 170 can active a BWP and deactivate others BWPs by switching to the BWP. For example, based on control information from the gNB, a BWP with BWP ID one or more BWPs with non-zero BWP ID can be activated and deactivated. A BWP with a smaller bandwidth can be entirely included within the bandwidth of another BWP that is assigned with a larger BWP ID, all within a bandwidth of BWP with a largest BWP ID. For example, BWP #0 is within the bandwidth of BWP #1/#2/#3, while BWP #1 is smaller and within the bandwidth of BWP #2 and BWP #3, and BWP #2 is smaller and within the bandwidth of the BWP #3.

In another aspect, a BWP may be configured explicitly as a Default BWP for SMR (SMR-DBWP) by an indication in the control information. Alternatively, the SMR-DBWP can be implicitly determined by the SMR 170. For example, a BWP with a lowest index or lowest value or ID can be designated as the SMR-DBWP that always remains activated, which is used for communication for a legacy UE. The SMR-DBWP could also be the BWP in which the SMR 170 successfully performs a cell search operation. Because a legacy UE may not know whether it is accessing an SMR or a gNB initially, at least one BWP need to remain activated or not be deactivated so synchronous signal block (SSB) or random access channel (RACH) resources can be communicated on this BWP. The SMR-DBWP is designed to serve the purpose to communicate with legacy UEs, which is served as a primary BWP and is not powered off always.

Figure 6:
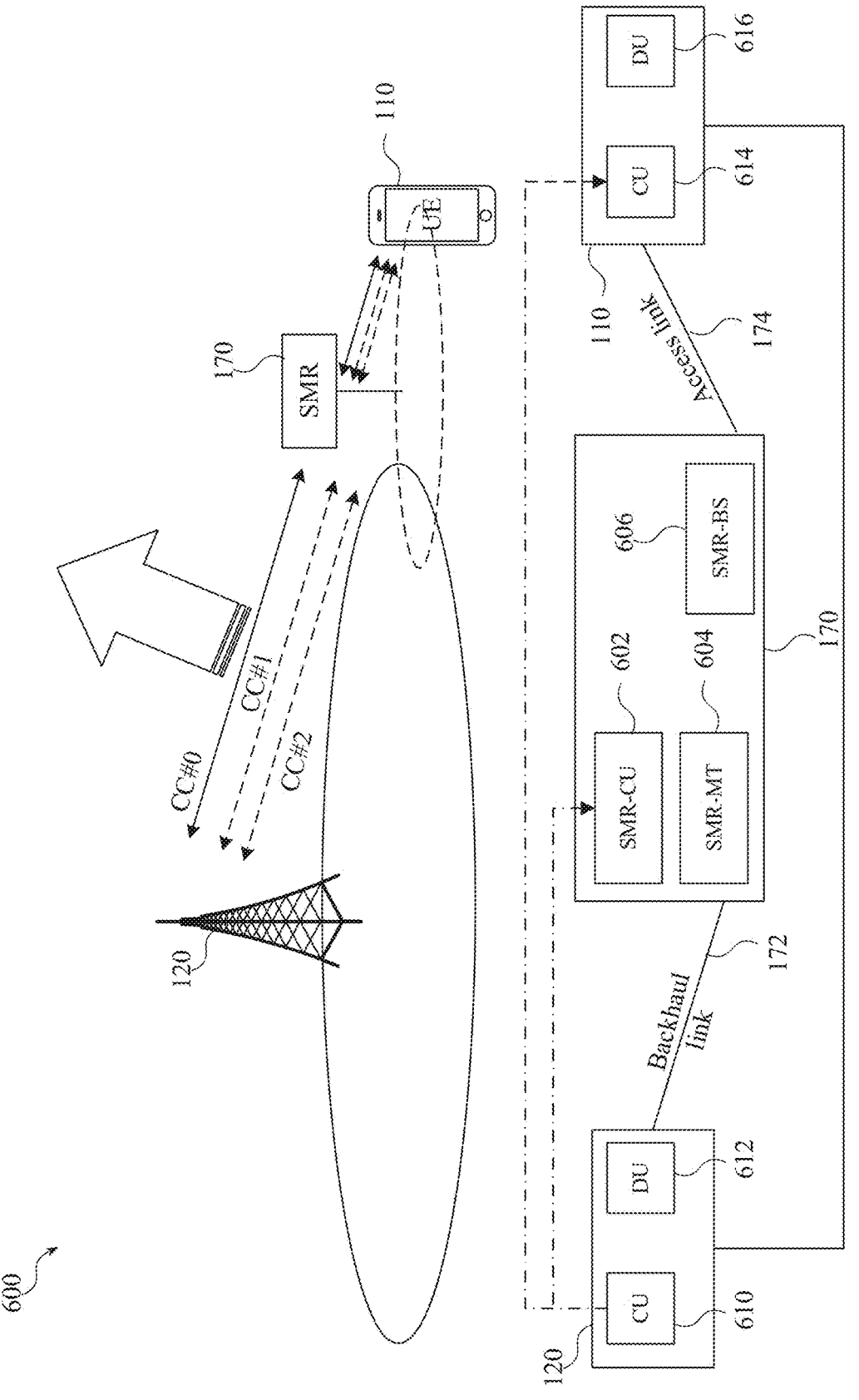
FIG. 6 illustrates an example smart repeater (SMR) network with control plane and user planet protocol stacks according to various aspects.

FIG. 6 illustrates a mobile communication system 600 with an SMR network in accordance with various aspects herein. The SMR 170 is communicatively coupled to the base station 120 (e.g., 122-1) via backhaul link 172 and to the UE 110 via access link 174. The SMR 170, for example, can communicate via one or more CCs for a CC-based power control mechanism that enables on-off operations over the CC's, as illustrated, or via a BWP-based power control mechanism as described herein.

The SMR 170 can comprise an SMR control unit (SMR-CU) component 602 that comprise one or more processors or processing circuitry for processing data and control information. The SMR-CU 602 is configured to receive the control information at a control-plane protocol layer and perform the on-off operations of the power control mechanism by activating/deactivating CCs or BWPs on the backhaul link 172 or/and the access link 174. The SMR-CU 602 performs on-off or activation/deactivation operations for the indicated CCs by the control information on both the backhaul link 172 and the access link 174 such that the power consumption can be minimized to achieve power saving goals.

The SMR 170 can further comprise an SMR Mobile Termination (SMR-MT) component 604 that terminates the backhaul link 172 between the SMR 170 and the base station 120 to process data of a user-plane protocol layer (e.g., a layer 2 protocol or other higher layer). The SMR 170 can further comprise an SMR Base Station (SMR-BS) component 606 that terminates the access link 174 between the SMR 170 and the UE 110 to also process data of the user-plane protocol layer.

The base station 120 can also comprise a one or more components with processing circuitry or a processing device, including a base station control unit (CU) component 610 and a data unit 612. The CU 610 can interface the side control information to the SMR-CU 602 and a UE CU 614 of the UE 110. The base station 120 can also communicate via other interfaces with data between the DUs 612 and 616.

The UE 110 can include the UE-CU component 614 that receives and processes the separate control information from the gNB 120 at a control-plane protocol layer to then process the on-off operations of the power control mechanism by activating/deactivating CCs or BWPs on the access link based on the detected control information from the gNB 120. Alternatively, or additionally, a CC (e.g., CC #0) of the CCs (e.g., CC #0 thru CC #2) or a default BWP of the BWPs can be always activated to ensure legacy UE access to the cell network of the base station 120. The UE-DU component 616 can receive and send data via a data of a user-plane protocol layer in direct communication with a base station or indirectly via a smart repeater.

In an aspect, the SMR 170 can thus be logically split into different units (e.g., two units), with one as the SMR-MT 604 and the SMR-BS 606. The SMR 170 can be configured to only support in-band operation for the SMR-MT 604 over the backhaul link 172 and SMR-BS over the access link 174. In the example of FIG. 6, the SMR 170 is configured with three CCs, although there is no limitation necessarily to the aspects described herein. The CCs, for example, are indexed from CC #0 to CC #2. Alternatively, the on-off operations for processing and transmitting signals at the SMR 170 can be BWP-based power control mechanism depending whether the control information indicates a BWP index or a CC index or provides another indication for which mechanism to configure.

Additionally, or alternatively, a default CC (solid double-sided arrow line) of the CCs or a default BWP of the BWPs can be always activated according to an indication in the control information or by an implicit determination via a lowest CC index (or BWP index) or a successful cell search operation thereon, for example. The CC or BWP to always activate can be determined by an explicit indication by the control information or some higher layer signaling, for example, or be predefined. In another example, a lowest CC or BWP index could implicitly indicate which CC or BWP to not be deactivated as the SMR-DCC or SMR-DBWP.

In an aspect, the base station 120 can determine which CCs or BWPs to be activated or deactivated at the SMR 170 based on the traffic load under the SMR coverage. This can be based on a predetermined load threshold or other parameters. The base station 120 can then control the on-off operations at the SMR 170 by indicating the CCs or BWP with associated indices or ID with the control information.

In an aspect, if the SMR 170 is configured with more than one SMR-CC or SMR-BWP, the base station 120 can operate to activate and deactivate any one of the SMR-CCs or SMR-BWPs except for the default SMR-DCC or SMR-DBWP to ensure legacy operation. The SMR-DCC or SMR-DBWP can be explicitly indicated or implicitly determined based on one or more the parameters with the control information (e.g., a lowest CC/BWP index or other parameter). Alternatively, an implicit determination can be made based on the CCE/BWP with a successful cell search being designated the primary CC/BWP.

In an aspect, the adaptation with on-off operations for the SMR 170 can be signaled using control information with a medium access control (MAC) control element (CE). Each SMR-CC or SMR-BWP can be enabled for activation/deactivation by a MAC CE. The SMR-CCs or SMR-BWPs to be identified for such can be identified by a MAC sub-header with a dedicated logical channel ID (LCID). The MAC-CE used for control information can have a fixed size. The MAC-CE can comprise one or more fields that include a SMR-CC index $C_i$ associated with an SMR-CC of the one or more SMR-CCs with a cell index i. Alternatively, or additionally, the fields can include an SMR-BWP index $BWP_i$ associated with an SMR-BWP of the one or more SMR-BWPs with a BWP index i. Alternatively, or additionally, instead of a bitmap being utilized for the SMR-BWP, an SMR-BWP indicator field can be included in the fields to indicate the index of the SMR-BWP for activation, for example. A reserved bit can be set to zero if it is being reserved, for example.

The field of $C_i$ or $BWP_i$ can indicate whether to deactivate the associated SMR-CC or the associated SMR-BWP based on bits provided in the fields or a bitmap. For example, the field of $C_i$ or $BWP_i$ can be set to '0' to indicate that the SMR-CC or SMR-BWP with index i is to be deactivated. Alternatively, if set to '1', this could designate being activated; although the reverse could also be true so that the present disclosure is not limited to any one particular convention where '0' could indicate activation and '1' indicate deactivation, for example.

Figure 7:
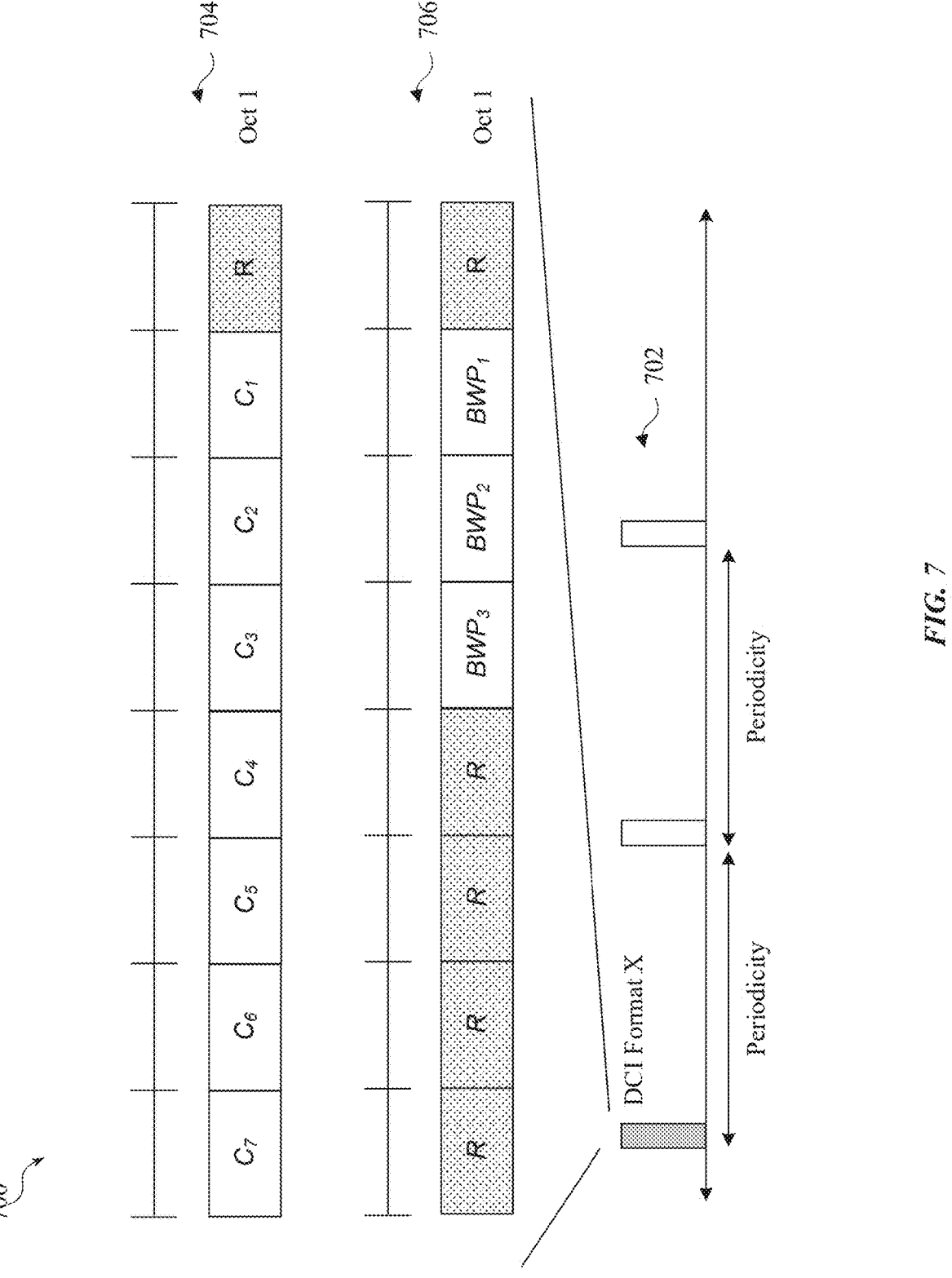
FIG. 7 illustrates another example downlink control information (DCI) format for bandwidth adaptation according to various aspects.

FIG. 7 illustrates an example configuration of control information for bandwidth adaptation in accordance with various aspects herein. A DCI format can be generated by the base station 120 for transmitting the activation/deactivation commands to enable power control mechanism. The DCI format X can be differentiated from other DCI formats based on a cyclic redundancy checksum (CRC) of the DCI format X being scrambled by a dedicate radio network temporary identifier (RNTI), or an identifier field in the DCI format X can include a predetermined value that identifies the DCI format.

As illustrated in FIG. 7, a DCI Format X can be received that conveys side control information for adapting the bandwidth according to different commands for activation/deactivation of a CC or a BWP. The DCI Format X at 702 can be monitored according to a periodicity by the SMR. An example of a DCI format X used for activation/deactivation purpose is illustrated and can be used depending on whether a CC-based power control mechanism is configured or a BWP-based power control mechanism is configured. A CC-based bitmap 704 is illustrated as an example by which various fields C7 through C1 can indicate a different SMR-CC to be activated/deactivated. One or more reserve fields R can also be present depending on a number of CCs or BWPs that are being controlled. A BWP based bitmap 706 for example can indicate bandwidth indicator fields $BWP_3$, $BWP_2$, and $BWP_1$ for example to indicate which BWPs are to be powered on-off based on the DCI Format indication.

In this example, $CC_0$ and $BWP_0$ is not present in bitmaps 704 and 706 because each of these can be designated as an SMR-DCC or an SMR-DWP, respectively, to ensure constant activation and used for communication with legacy UEs. An advantage of using a DCI format for commanding various on-off operations for the power control mechanism is a faster processing time, which can be beneficial for having a default BWP or default CC that is always on such as for video processing or other real time latency sensitive communication with a legacy UE in the SMR network.

In an aspect, the SMR 170 can provide a search space configuration for DCI Format X monitoring, including a set of associated parameters. The search space set can be configured for DCI format monitoring based on search space set parameters. These parameters can include a control channel element (CCE) aggregation level (AL) and candidates of the CCE AL. The CCE AL and associated candidates for each CCE could alternatively be predetermined. Because the backhaul link between the base station 120 and the SMR 170 may not be moving fast or even fixed, the AL may not be utilized to deal with fast fading radio channels. Thus, if reliability is prioritized then a larger AL such as AL 16 or 8 can be predetermined and no need of signaling. Otherwise, in order to avoid the SMR monitoring many ALs, the DCI Format X could be fixed to a smaller number of ALs.

The search space set parameters can further comprise a periodicity, an offset and a control resource set (CORESET), for example. The time-domain location of the CORESET can be limited to be within a predefined number of first symbols in a slot (e.g., first, second or third symbols in a slot). In the frequency domain, a frequency location can be limited or configured to be within an SMR-DCC or an SMR-DBWP. Alternatively, or additionally, the frequency location of a CORESET can be indicated by an explicit indication with an ARFCN, for example, which could provide additional flexibility in signaling the location of the CORESET.

Figure 8:
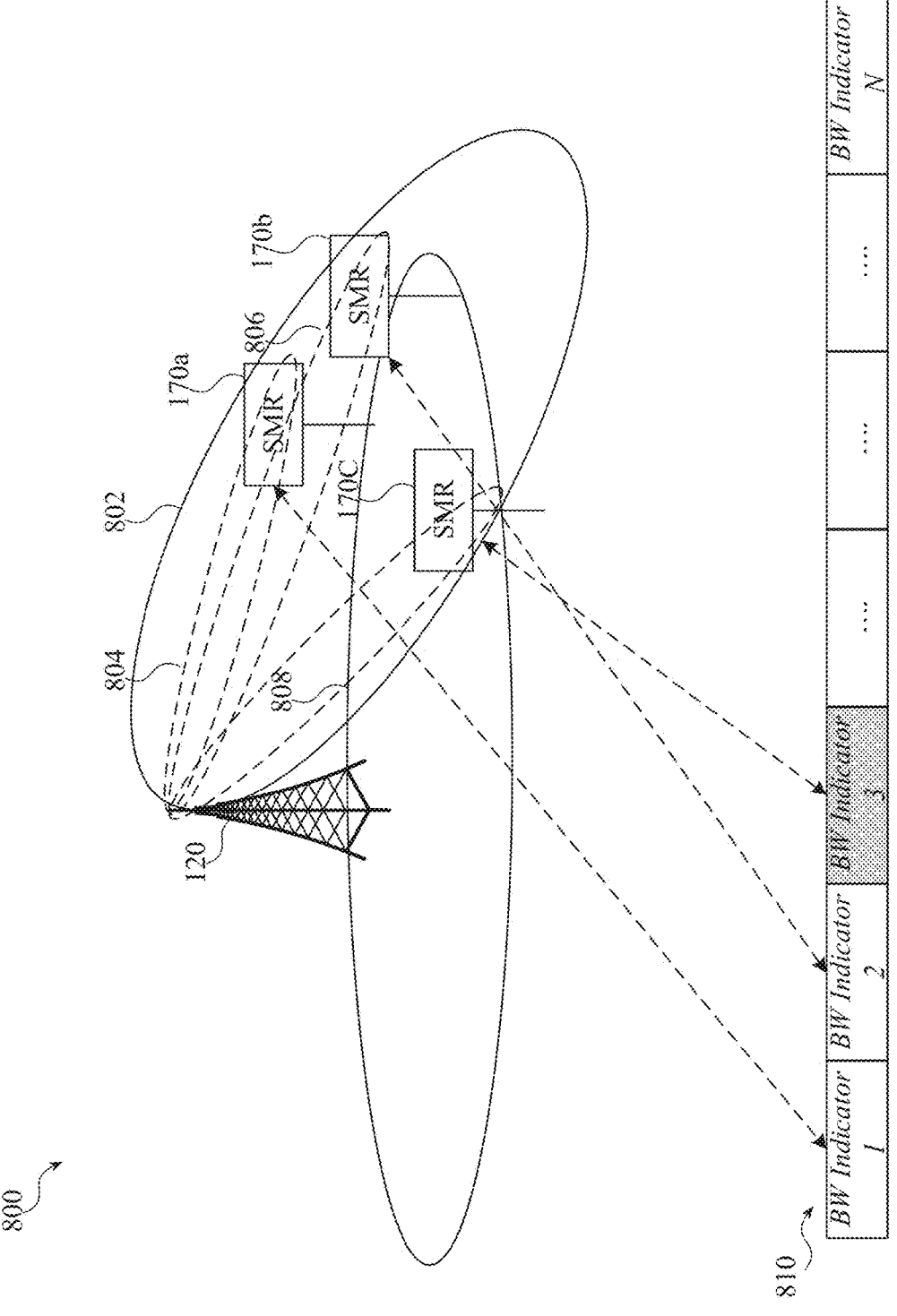
FIG. 8 illustrates an example group common DCI format for bandwidth adaptation according to various aspects.

FIG. 8 is an exemplified group common DCI format X for bandwidth adaption for SMR in accordance with various aspects herein. A DCI format X 810 can be used for more than one SMRs (e.g., SMR 170*a*, 170*b*, 170*c*) to trigger a CC-based or BWP-based activation/deactivation with control information from the base station 120. The DCI Format X 810 can include bandwidth (BW) indicators (e.g., BW indicator 1, BW indicator 2, BW indicator 3 . . . . BW indicator N) so that each BW indicator can comprise a set of $C_i$ fields or a set of $BWP_i$ fields as control information for activation/deactivation of one or more CCs or BWPs for a given SMR, respectively.

Here, the payload of each DCI Format X for controlling or commanding activation/deactivation in on-off operations can be configurable depending on how many BWPs or CCs are supported by the SMR 170, for example. Each DCI can include three bits for three BWPs, for example. Here, each BW indicator can comprise these bits for a number of CCs or BWPs and be associated with a different SMR 170 as a group common DCI 810.

The set of control information therefore can be configured for a single DCI for multiple SMRs. In DCI 810, BW indicator 1 can correspond to or be configured for controlling SMR 170*a*. BW indicator 2 can correspond to or be configured for controlling SMR 170*b*. Likewise, BW indicator 3 can correspond to or be configure for controlling SMR 170*c*. For the group common DCI 810, the base station 120 utilizes a wider beam 802 for transmitting the side control information, and a narrower beam than beam 802 in order to provide SMR-specific data transmission in order to improved beam forming performance for data transmission. Thus, different beam widths can be applied at the base station 120 for SMR data with narrow beams 804 to SMR 170*a*, 806 to SMR 170*b*, and 808 to SMR 170*c*, and a wider beam for the group common DCI Format X over a backhaul link to improve resource efficiency.

The base station 120 can aggregate BW indicator fields #1, #2, #3 into a single DCI format or DCI Format X. Each of the indicators is a target for a particular SMR 170 and each BW indicator can have the sub fields, such as the CC index or the BWP index as a part of the BW indicator. For example, if BW indicator 1 is targeting SMR 170*a*, each of the bits (e.g., three bits as corresponding to ($BWP_3$, $BWP_2$, $BWP_1$ of FIG. 7) can correspond with or be associated with one BWP of that corresponding SMR 170*a*, for example. The same can be the case with CCs or any other number of associated bits can be envisioned.

In an aspect, because the SMR 170*a* does not realize other SMRs 170*b* and 170*c*, for example, and how many other BW indicators of other SMRs are aggregated in the group common DCI format 810, the base station can generate DCI Format size to be configurable. For example, the base station 120 can make the BW indicator fields smaller if reliability is more important and based on the interference level of the cell. As such, because the DCI size is configurable or adaptable, the different indicators can have a different size compared to one another. For example, some of the SMRs could have two BWPs and some have less or more than two BWPs with more or less corresponding bits to each BWP.

Correspondingly, the size of each BW indicator field could also be different within the same group common DCI format 810.

In an aspect, the size of the DCI format or DCI Format X can be configurable by higher layers up to a maximum payload size or a predetermined maximum payload size. Because each SMR should be able to locate its corresponding BW indicator for activation and deactivation of on-off operations according to a CC based power control mechanism or a BWP power control mechanism, the first bit can be the location of the field associated with the particular SMR in the group DCI, or be hard coded. Alternatively, or additionally, the locations of the BW indicator fields in the DCI Format X or group common DCI format can be indicated by a bandwidth indication for the position of each SMR (e.g., positionInDCI, or other indicator) such as by RRC signaling or higher layer signaling, for example.

Figure 9:
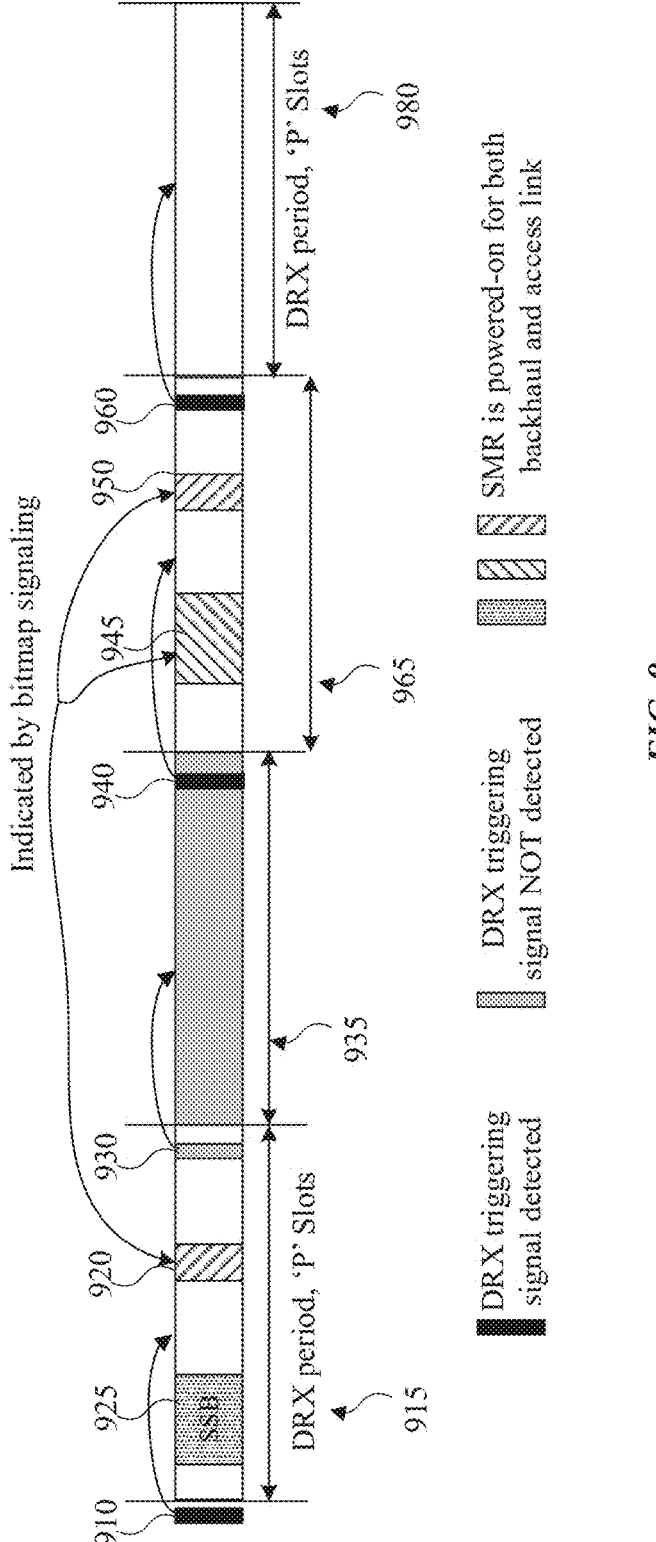
FIG. 9 illustrates example discontinuous (DRX) operations for an SMR according to various aspects.

FIG. 9 is an example of L1 based discontinuous (DRX) operation for SMR in accordance with various aspects herein. To further minimize power consumption and maximize power efficiency, the SMR 170 can configure DRX operation with a DRX active period that follows with a DRX inactive period where the SMR can enter into idle mode or sleep mode with a lower power operating state for the backhaul link along a periodic pattern.

In an aspect, the SMR 170 can be configured to not monitor a DL signal from the base station 120 over the backhaul link 172 in the DRX inactive period. The DRX cycle includes a DRX inactive period where the SMR 170 enters a powered off or powered down sleep mode. The DRX can be configured based on a periodicity 'P' of offset values (M ms, with 0, . . . , (M−1), or other offset with M being an integer). These DRX parameters can be signaled via a DRX trigger, for example.

In an aspect, the SMR 170 can monitor in a DRX monitoring cycle that overlaps at least in part with the DRX active mode in a fully powered state (power on) or a DRX inactive state (powered off/idle). The SMR 170 can be configured to monitor for a DRX trigger signal that initiates or triggers DRX operation with active and inactive periods for a group of CCs. When operating in DRX mode the SMR 170 can also be configured to detect physical layer signals or channels on the SMR-DCC or SMR-BWP as a default operation regardless of being in the DRX active or inactive period of a DRX cycle.

Four DRX cycles 915, 935, 965, and 980 are configured for a given SMR 170 for the sake of example illustration in FIG. 9. Corresponding DRX-trigger signals 910, 930, 940, 960 can be configured to control the DRX operation for each DRX cycle. The SMR 170 detects the DRX-triggering signals 910, 940, 960 associated with different DRX periods 915, 965, and 980. At 930, no DRX triggering signal is detected in association with DRX period 935. In DRX period 915, the SMR is allowed to power-off the backhaul 172 and access link 174 except the symbol of SMR-SSBs 925 and the symbols 920 reserved by base station for scheduling request or sounding reference signals (SRS) transmissions of SMR-UEs, for example. Similarly, the SMR 170 transitions to a sleep state except the symbols 945, 950, which can be indicated by a bitmap signaling for DRX cycle 965. In DRX period 980, there is no symbols reserved for wake-up and therefore the whole period allows SMR to sleep.

In contrast to the DRX periods 915, 965, 980, the SMR 170 does not detect the configured DRX-trigger signal 930 that is associated with DRX period 935. As one sequence, the SMR 170 is then configured to power-on the backhaul 172 and access link 174 over the entire DRX period 935.

If the SMR 170 receives or detects a DRX trigger signal, then the SMR 170 is not required to receive or transmit in a group of CCs during a DRX cycle 'P' (e.g., cycles 915, 965, 980), for example, except for any exceptions with particular symbols or slots. In an example of such an exception, the SMR 170 can still be configured to receive or transmit at symbols or slots configured for transmission of an SMR synchronous signal block (SMR-SSB) or an SMR channel state information reference signal (SMR-CSI-RS), which can be used for tracking, beam-management, or mobility operations.

Additionally, or alternatively, side control information can be generated by the base station 120 with a bitmap that indicates in a symbol granularity a number of slots, or which slots, that SMR 170 could not sleep during a DRX cycle. For example, symbols 920, 945, and 950 can be indicated by the bitmap signaling. These symbols, for example, could be used for an UL transmission, but may be transparent to the SMR 170 without knowing that some of the symbols are reserved for a legacy UE. The SMR 170 can receive the bitmap with the DRX trigger signal, in a DCI or other configuration and ensure these symbols are always powered-on for both backhaul and access link. The SMR 170 does not necessarily know that some of the symbols may be reserved for the legacy UE, in which the base station 120 may have separately configured through UL SPS or a configured grant based transmission in some of the slots, for example.

Additionally, or alternatively, the SMR 170 can be configured with a symbol level bitmap spanning a number of slots for which the DRX operation is not applied. As one example, reserved' symbols can be scheduled by the base station 120 for SMR-UEs 170*a* thru 170*c* to transmit periodic uplink signals (e.g., a scheduling request (SR) transmission, control information for SMR-CCs activation/deactivation operations, or other UL). For example, a DRX trigger signal 910, 930, 940, 960 can be a DCI format as a DRX trigger DCI format that includes a bitmap field (e.g., BW indicator field or the like) indicating the symbols or slots for DRX operation to not be applied at and the SMR 170 is powered on/activated. The DRX trigger signal 910, 930, 940, 960 can be configured to control the DRX monitoring cycle in a DCI format for one or more SMRs based on subsets of CCs of a plurality of CCs or a BWP based on at least one bit of the bitmap. The DRX trigger DCI can be configured with a DRX monitoring occasion for the DRX cycle and DRX monitoring occasion can be configured by RRC signaling prior to a first slot of the DRX.

In an aspect, CC's can be grouped into different groups or subsets of CCs with the DRX trigger signal being associated with different groups to control which CC groups can enter sleep mode for DRX operations. The DRX trigger can comprise one or more indications or identifiers of which CCs are in which groups, which groups are always active, or which groups can enter DRX inactive mode. An advantage here, is to reduce overhead when a large amount of CCs can be configured for the SMR. A bitmap could thus potentially be avoided by utilizing the DRX trigger signal for designating specific CCs within a group to be always on or not simultaneously during DRX operations.

Figure 10:
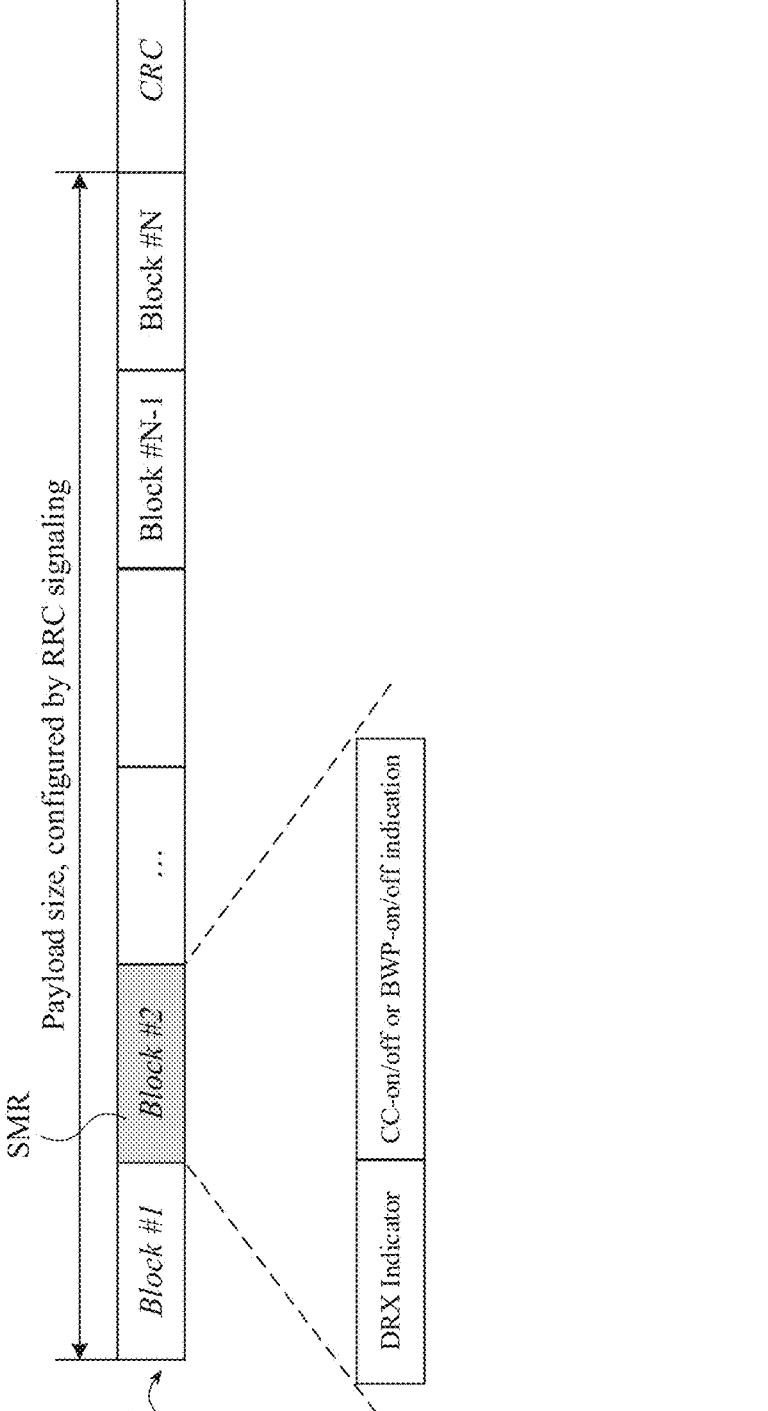
FIG. 10 illustrates an example DCI format for a DRX triggering signal for one or more SMRs according to various aspects.

FIG. 10 illustrates an example of a DCI format for DRX trigger signaling for an SMR in accordance with various aspects. A DCI format 1010 such as a DCI Format Y or other dedicated DCI format can be utilized to trigger the DRX operations at the SMR 170 and be used to convey candidates for physical layer DRX trigger signaling, for example. The DCI format 1010 can notify one or more SMRs of DRX information that is outside of the DRX active time, such as by indicating what slots or symbols should remain active and not inactive according to the DRX trigger signals 910, 930, 940, 960 in a DRX inactive period. The DCI format 1010 can include CRC bits of a CRC block that are scrambled according to a dedicated DRX-RNTI. Each resource block (Block #1, Block #2, . . . , Block #N–1, Block #N) of a DCI payload can include a DRX indicator and indications of the CCS or BWPs utilized in on-off operations, where each resource block can correspond to a particular SMR. Each SMR therefore can be provided a DRX indicator by a bit, for example that indicates whether the SMR is allowed to skip DL/UL transmissions/receptions for all of the SMR-CCS or SMR-BWPs. For example, if the DRX indicator of Block #2 corresponds with SMR 170 and is set to '0', then SMR 170 could skip the DL/UL transmissions/receptions for all of the SMR-CCS or SMR-BWPs.

In an aspect, each block can include the CCs or BWPs for on-off operations with one or more indications. These indications can be configured as the bitmap described, in which each bit can correspond to one of the SMR-CC group(s) configured by higher layers parameter, with a most significant bit (MSB) to a least significant bit (LSB) of the bitmaps corresponding to a first to last configured SMR-SCell group or SMR cell group as a secondary cell, for example.

Where the BWP-base power control mechanism is configured and BWP information is being provided as indication as much, either an BWP-ID of the RRC configured BWPs or a reserved codepoint can be used to indicate if none of the BWPs is being powered on or activated. In one example, the base station 120 can configure three BWPs with BWP-ID 0/1/2. A codepoint of '1 1' can be used to indicate that none of the BWPs is selected and the SMR 170 can be powered off for SMR-BWPs.

Figure 11:
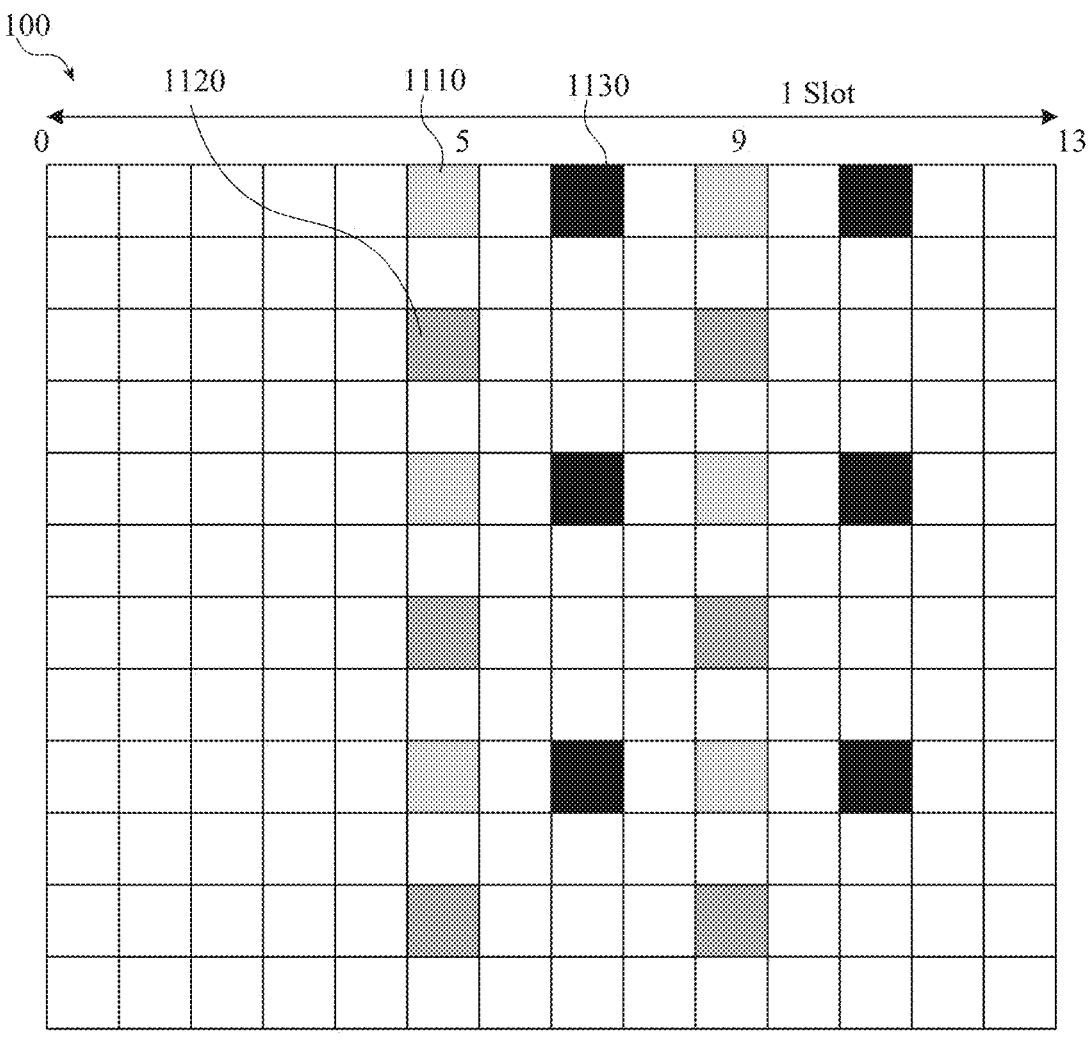
FIG. 11 illustrates an example DRX triggering signal for an SMR according to various aspects.

FIG. 11 illustrates another example for DRX trigger signaling for the SMR in accordance with various aspects. Here, the DRX trigger can comprise an SMR channel state information reference signal (SMR-CSI-RS) that configures tracking reference signal (TRS)/CSI-RS resources in a DRX monitoring occasion. Compared to a DCI format as discussed with respect to FIG. 10, a SMR-CSI-RS can further reduce overhead with a CSI-RS structure being configured to serve as the DRX triggering signal. The SMR 170, for example, can utilize frontend hardware to receive the signal without invoking a core baseband hardware for PDCCH decoding, for example, and thus be less complex while reducing power consumption. For example, the SMR-MT 604 can operate with processing circuitry to configure DRX operations based on the DRX triggering signal. Here, a baseband processor does not necessarily need to process the DRX signal, but rather an envelope check can be performed to determine whether a CSI-RS sequence being transmitted by the base station 120 and correspondingly determine the BWP or CC being used to powered on for a certain DRX cycle.

In an aspect, the SMR-CSI-RS can operate as the DRX trigger signal to configure a tracking reference signal (TRS)/CSI-RS resources in a DRX monitoring occasion. Each TRS/CSI-RS resource can indicate on-off operations for an SMR-CC group or BWP for a given SMR or for a different SMR. Multiple TRS/CSI-RS resources can be frequency division multiplexed (FDMed), time division multiplexed (FDMed), or code division multiplexed (CDMed) in the same monitoring occasion. For example, the base station 120 can assign a TDMed/FDMed TRS resource 1110, 1120,

1130 to different SMRs (e.g., 170a, 170b, 170c), respectively, for DRX triggering according to different BWPs or CCs.

In an aspect, a set of TRS sequences can be configured or reserved to indicate the on-off operations for SMR-CC groups/BWP for the SMR 170 or multiple SMRs 170a, 170b, 170c, for example. The SMR 170, for example, can perform a correlation check based on one or more parameters of the TRS sequence. The following representation can be utilized to generate the TRS sequence as an SMR-specific sequence:

$$r(m) = \frac{1}{\sqrt{2}}(1 - 2 \cdot c(2m)) + j\frac{1}{\sqrt{2}}(1 - 2 \cdot c(2m + 1));$$

and $$C_{init} = \left(2^{10}\left(N_{symb}^{slot}n_{s,f}^{\mu} + l + 1\right)(2n_{ID} + 1) + n_{ID}\right)\mathrm{mod}\ 2^{31}.$$

Here, the key parameter $n_{id}$ is associated with different SMR-BWPs and is used as the parameter to generate the SMR specific sequence, which is a reason it could be different when received at the SMR side after performing an auto correlation. The parameter $n_{id}$ can be equal to a higher-layer parameter scrambling ID for a SMR. The variable r(m) refers to the TRS sequence CSI-RS, and $C_{init}$ is utilized as a functional seed to generate the sequence and initiate a signal generation.

Figure 12:
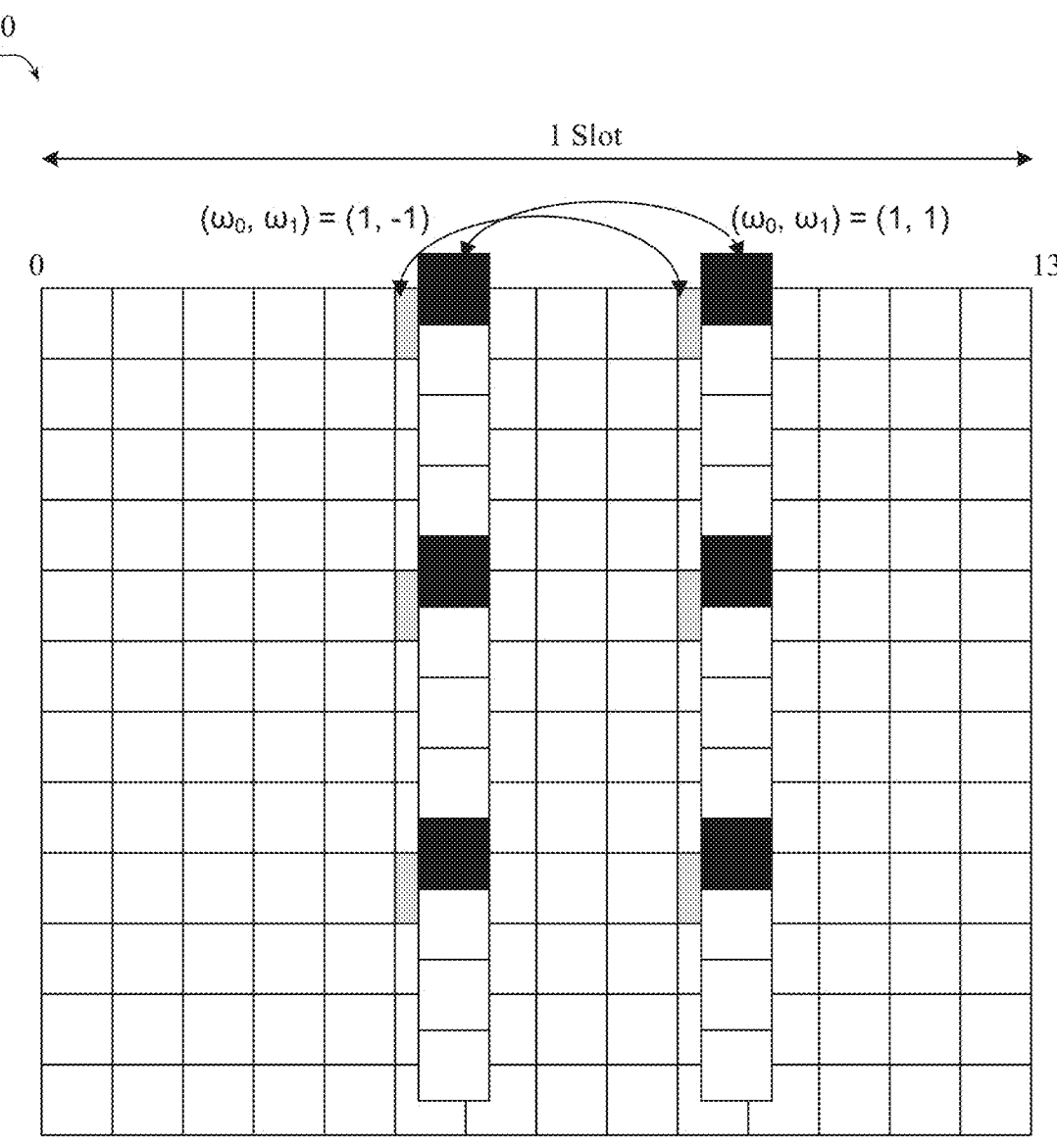
FIG. 12 illustrates another example DRX triggering signal for an SMR according to various aspects.

FIG. 12 illustrates another example of CSI-RS/TRS based DRX trigger signal for SMR in accordance with various aspects. A TRS sequence can be associated with Orthogonal Cover Code (OCC) as transmitted in the DRX-triggering signal monitoring occasion where one OCC indicates one SMR-CC group, BWPs, or a combination of CC groups/BWPs. The OCC can be utilized across the TRS sequence to be associated with one or more different SMRs. For example, one of the TRS resources can have a different OCC code, which can be different on the SMR side so that what is corresponding to the SMR 170, for example, is the BWP or the CC that the base station 120 would like to activate or deactivate for the associated DRX cycle. The symbols of the TRS may be spread with the SMR specific OCC code e.g., ($\omega$0, $\omega$1)=(1, 1) for SMR #1 (e.g., 170a) and ($\omega$0, $\omega$1)=(1, −1) for SMR #0 (e.g., 170b).

Figure 13:
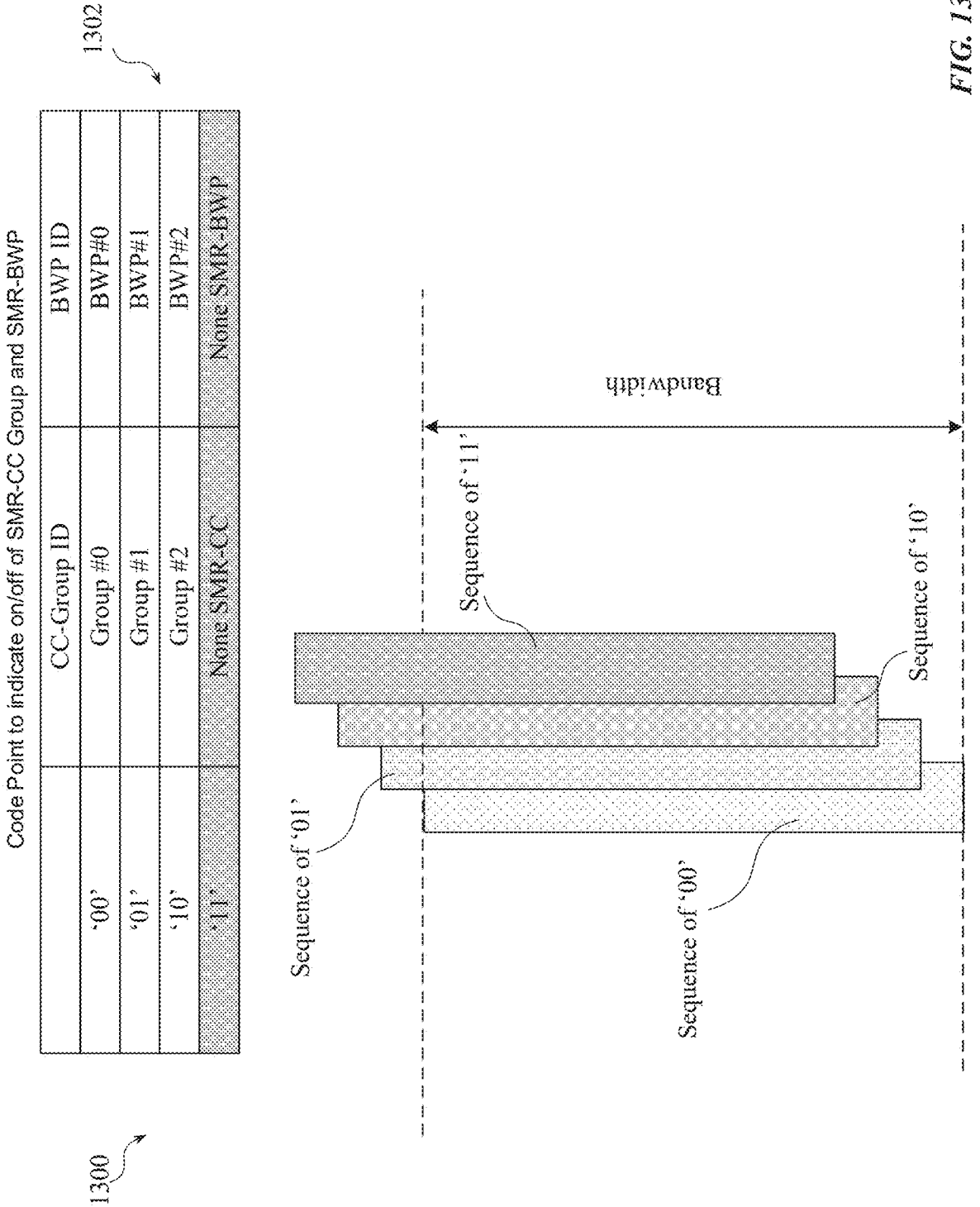
FIG. 13 illustrates another example DRX triggering signal for an SMR according to various aspects.

FIG. 13 is an example M sequence based DRX triggering in accordance with various aspects. In another example, the DRX triggering signal can be determined based on a pure binary phase shift keying (BPSK) M sequence that configures carrier frequency checking and further operates to indicate activation/deactivation of a group or subset of CCs, or one or more BWPs for one or more SMRs. An M or m-sequence of the BPSK M sequence can be based on a number of resource elements (REs) mapped to the DRX trigger signal and an SMR-CC group index or a BWP index, for example. If the BPSK M sequence is determined, then it can be used to do the frequency sequence checking. The parameter M can be associated with for example the CC group index of a CC group CCG or associated with the BWP index. This index can be used to determine the M number, which in turn can be used to generate the BPSK M sequence.

The BPSK M sequence can be represented as follows:

$D_{DRX}$ (n)=1−2x(m)−x(I+7)=(x(i+4)+x(i)) mod 2−[x(6) x(5) x(4) x(3) x(2) x(1) x(0)]= [1 1 1 0 1 1 0]; n=0, 1, . . . , K−1, and $$m = \left(n + 43\ N_{CCG\ or\ BWP}^{ID}\right)\mathrm{mod}\ K.$$

Here, K can be determined based on a number of REs of a DRX triggering signal.

$$N_{CCG\ or\ BWP}^{ID}$$

can be the identifier or ID of an SMR-CC group or ID of a BWP. For example, if one RE is used, then that could be 12, so that capital K is equal to 12, and if 2 REs will be 24. As such K can be determined based on the number of REs for the DRX triggering signal to occupy and further directly associated with detection performance.

In an aspect, one of $$N_{CCG\ or\ BWP}^{ID}$$

codepoints can be encoded or predefined to indicate the power off for all SMR-CCs or all BWPs, including the SMR-DCC or SMR-DBWP. Table 1302 illustrates three CC groups or BWPs that are configured for SMR. Correspondingly, the codepoint '11' is reserved to indicate power off for all of the SMR-DCC or the SMR-DBWPs.

As such, different sequences can be associated with different BWP IDs for example, and can be multiplexed together in the code domain on the left side through the different sequences '00', '01', '10', '11', in order to not increase the overhead when controlling for the BWPs simultaneously with on off operations.

While the methods described within this disclosure are illustrated in and described herein as a series of acts or events, it will be appreciated that the illustrated ordering of such acts or events are not to be interpreted in a limiting sense. For example, some acts can occur in different orders and/or concurrently with other acts or events apart from those illustrated and/or described herein. In addition, not all illustrated acts can be required to implement one or more aspects or embodiments of the description herein. Further, one or more of the acts depicted herein can be carried out in one or more separate acts and/or phases. Reference can be made to the figures described above for ease of description. However, the methods are not limited to any particular embodiment, aspect or example provided within this disclosure and can be applied to any of the systems/devices/components disclosed herein.

A first example is a smart repeater (SMR), comprising: a memory; and a processing circuitry configured to, when executing instructions stored in the memory, cause the SMR to: receive communications to amplify and forward to a base station or a user equipment (UE), and control information to manage power efficiency; and configure a power control mechanism based on the control information to adapt one or more bandwidths associated with the SMR to save power and forward the communications to the base station or the UE, wherein the control information comprises at least one of: a component carrier (CC) index, a bandwidth part (BWP) identifier (ID), a set of parameters to configure on-off operations of the one or more bandwidths, or a combination of thereof.

A second example can include the first example, wherein the processing circuitry is further configured to: in response to the control information comprising the CC index, forward the communications with the on-off operations of the power control mechanism based on a carrier aggregation of two or more CCs associated with different CC indices of different bandwidths, wherein the set of parameters include at least one of: an absolute radio frequency channel number (ARFCN) of a CC, a CC bandwidth, or other frequency information for downlink communication and uplink communication.

A third example can include the first or second example, wherein the processing circuitry is further configured to: determine a CC of the two or more CCs as an SMR-default CC to be always powered on through the on-off operations of the power control mechanism with other CCs of the two or more CCs, wherein the SMR-default CC is determined based on an explicit indication of the CC, or an implicit indication of the CC based on a CC index or based on a successful cell search operation.

A fourth example can include any one or more of the first through third examples, wherein the processing circuitry is further configured to: in response to the control information comprising a BWP ID, forward the communications and configuring the on-off operations of the power control mechanism, based on BWPs of a bandwidth, wherein the set of parameters include at least one of: an ARFCN of a BWP, a bandwidth of the BWP, or other frequency information for downlink communication and uplink communication, and wherein each BWP of the BWPs corresponds to a different value associated with the set of parameters.

A fifth example can include any one or more of the first through fourth examples, wherein the processing circuitry is further configured to: determine a BWP of the BWPs as an SMR-default BWP to be always powered on through the on-off operations of the power control mechanism with other BWPs of the BWPs, wherein the SMR-default BWP is determined based on an explicit indication of the BWP, or an implicit indication of the BWP that is based on a BWP index or based on a successful cell search operation.

A sixth example can include any one or more of the first through fifth examples, further comprising: an SMR Mobile Termination (SMR-MT) component configured to terminate a backhaul link between the SMR and the base station and process data of a user-plane protocol layer; an SMR Base Station (SMR-BS) component configured to terminate an access link between the SMR and the UE and process data of the user-plane protocol layer; and an SMR control unit (SMR-CU) component configured to receive the control information at a control-plane protocol layer and perform the on-off operations of the power control mechanism by activating/deactivating CCs or BWPs on the backhaul link and the access link, wherein a default CC of the CCs or a default BWP of the BWPs is always activated.

A seventh example can include any one or more of the first through sixth examples, wherein the processing circuitry is further configured to: activate and deactivate one or more SMR-CCs or one or more SMR-BWPs based on a medium access control (MAC) control element (MAC-CE), wherein the MAC CE is identified by a MAC sub-header with a dedicated logical channel ID (LCID) having a fixed size and comprises one or more fields that includes a cell index associated with an SMR-CC of the one or more SMR-CCs or a BWP index associated with an SMR-BWP of the one or more SMR-BWPs indicating whether to deactivate the associated SMR-CC or the associated SMR-BWP.

An eighth example can include any one or more of the first through seventh examples, wherein the processing circuitry is further configured to: activate and deactivate one or more SMR-CCs or one or more SMR-BWPs based on a downlink control information (DCI) format of the control information, wherein a cyclic redundancy checksum (CRC) of the DCI format is scrambled based on a dedicated radio network temporary identifier (RNTI), or an identifier field in the DCI format comprises a predetermined value that identifies the DCI format.

A ninth example can include any one or more of the first through eighth examples, wherein the processing circuitry is further configured to: configure a search space set for the DCI format monitoring based on search space set parameters, a control channel element (CCE) aggregation level (AL) and candidates of the CCE AL, wherein the CCE AL is predetermined and the search space set parameters comprise a periodicity, an offset and a control resource set (CORESET), and wherein a time-domain location of the CORESET is limited to be within a predefined number of first symbols in a slot, a frequency location is limited to be within an SMR-DCC or an SMR-DBWP or an explicit indication by an ARFCN.

A tenth example can include any one or more of the first through ninth examples, wherein the processing circuitry is further configured to: receive a DCI Format that comprises at least one bandwidth indicator field that comprises one or more SMR-CC fields or SMR-BWP fields to trigger a CC based power control mechanism or a BWP based power control mechanism, wherein a size of the DCI format is configured based on a radio resource control (RRC) signaling or a higher layer signaling and a location of the bandwidth indicator in the DCI format for each SMR of a plurality of SMRs is indicated by higher layer signaling.

An eleventh example can include any one or more of the first through tenth examples, wherein the processing circuitry is further configured to: receive a group DCI format with the control information comprising an aggregation of different DCI bandwidth indicator fields of a plurality of SMRs to enable bandwidth adaptation among the plurality of SMRs, wherein the group DCI format is received over a backhaul link with a wide beam; and receive data for forwarding over the backhaul link with a narrow beam that is narrower than the wide beam.

A twelfth example can include any one or more of the first through eleventh examples, wherein the processing circuitry is further configured to: in response to receiving a discontinuous reception (DRX) trigger signal, configuring a DRX monitoring cycle comprising a DRX active mode and a DRX inactive mode, and monitoring downlink communication only in the DRX active mode based on a set of DRX parameters at least one of: a DRX cycle periodicity or one or more offset values; and powering off or entering a sleep mode to not monitor a backhaul link with one or more CCs during the DRX inactive mode of the DRX monitoring cycle except for any symbols/slots being reserved by an indication of the DRX trigger signal.

A thirteenth example can include any one or more of the first through twelfth examples, wherein the processing circuitry is further configured to: in response to the indication of the DRX trigger signal indicating one or more symbols/slots for a transmission of an SMR synchronous signal block (SMR-SSB) or an SMR channel state information reference signal (SMR-CSI-RS), or comprising a bitmap corresponding to the one or more symbols/slots, enabling a transmission or a reception during the DRX monitoring cycle based on the indication.

A fourteenth example can include any one or more of the first through thirteenth examples, wherein the DRX trigger signal is configured to control the DRX cycle in a DCI format for one or more SMRs based on subsets of CCs of a plurality of CCs or a BWP based on at least one bit of the bitmap, wherein the DRX trigger signal in a DCI is configured with a DRX monitoring occasion for the DRX cycle and the DRX monitoring occasion is configured by RRC signaling prior to a first slot of the DRX monitoring cycle.

A fifteenth example can include any one or more of the first through fourteenth examples, wherein the DRX trigger signal comprises an SMR channel state information reference signal (SMR-CSI RS) that configures tracking reference signal (TRS)/CSI-RS resources in a DRX monitoring occasion, a set of reserved TRS sequences, or a TRS sequence with an orthogonal cover code (OCC) to indicate activation or deactivation of at least one of: a subset of CCs of a plurality of CCs or one or more BWPs for one or more SMRs.

A sixteenth example can include any one or more of the first through fifteenth examples, wherein the DRX trigger signal is based on a binary phase shift keying (BPSK) M sequence that configures carrier frequency checking and indicates activation or deactivation of at least one of: a subset of CCs of a plurality of CCs or one or more BWPs for one or more SMRs, wherein an M sequence of the BPSK M sequence is based on a number of resource elements (REs) mapped to the DRX trigger signal and at least one of: an SMR-CC group index or a BWP index.

A seventeenth example is a base station comprising: a memory, and a processing circuitry configured to: generate control information associated with a smart repeater (SMR) to amplify and forward communications based on a power saving mechanism by adapting one or more bandwidths over at least one of: a backhaul link or an access link based on the control information, wherein the control information comprises at least one of: a component carrier (CC) index or a bandwidth part (BWP) identifier (ID), a set of parameters to configure on-off operations of the one or more bandwidths, or a combination thereof; and transmit the control information to the SMR.

An eighteenth example can include the seventeenth example, where the processing circuitry is further configured to: determine a traffic load under a coverage of the SMR; and generate the control information based on the traffic load, wherein the control information is provided via a medium access control (MAC) control element (MAC CE), a downlink control information (DCI) format, or a group common DCI format.

A nineteenth example includes any one or more of the seventeenth through eighteenth examples, where the processing circuitry is further configured to: provide a discontinuous reception (DRX) trigger signal to configure discontinuous reception for the SMR to enter into sleep mode without monitoring the backhaul link during a DRX inactive mode of a DRX cycle except for one or more slots/symbols associated with an SMR synchronous signal block (SMR-SSB) or an SMR channel state information reference signal (SMR-CSI-RS) and symbols indicated in a bitmap.

A twentieth example includes any one or more of the seventeenth through nineteenth examples, wherein the DRX trigger signal enables activation and deactivation of at least one of: one or more subsets of CCs or BWPs, based on a DRX indication in the bitmap corresponding to one or more SMRs and is provided in a DCI format, a CSI-RS, or a binary phase shift keying (BPSK) M sequence.

A twenty-first example can be a user equipment (UE), comprising: a memory; and a processing circuitry configured to, when executing instructions stored in the memory, cause the UE to: receive communications forwarded from a smart repeater; and process the communication by adapting one or more bandwidths based on control information associated with a power control mechanism from a base station and over an access link from a smart repeater (SMR), wherein the control information comprises at least one of: a component carrier (CC) index or a bandwidth part (BWP) identifier (ID), a set of parameters associated with on-off operations of the one or more bandwidths, or a combination of thereof.

A twenty-second example can include the twenty-first example, further comprising: a UE control unit (UE-CU) component configured to receive the control information at a control-plane protocol layer and process the on-off operations of the power saving mechanism by activating/deactivating CCs or BWPs on the access link, wherein a default CC of the CCs or a default BWP of the BWPs is always activated; and a UE data control unit (UE-DU) component configured to receive and send data via a data of a user-plane protocol layer in direct communication with a base station or indirectly via a smart repeater.

A twenty-third example can include any one or more of the twenty-first through twenty-second examples, wherein the processing circuitry is further configured to: in response to the control information comprising the CC index, process the communications with the on-off operations of the power control mechanism based on a carrier aggregation of two or more CCs associated with different CC indices of different bandwidths; and in response to the control information comprising a BWP ID, process the communications with the on-off operations of the power control mechanism based on BWPs of a bandwidth; wherein the set of parameters include at least one of: an absolute radio frequency channel number (ARFCN), a bandwidth, or other frequency information associated with downlink communication and uplink communication, wherein at least one CC of the two or more CCs is an SMR-default CC, or a BWP of the BWPs is an SMR-default BWP, that is always powered on through the on-off operations of the power control mechanism with other CCs of the two or more CCs or other BWPs of the BWPs.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The present disclosure will now be described with reference to the attached drawing figures, wherein like reference numerals are used to refer to like elements throughout, and wherein the illustrated structures and devices are not necessarily drawn to scale. As utilized herein, terms "component," "system," "interface," and the like are intended to refer to a computer-related entity, hardware, software (e.g., in execution), and/or firmware. For example, a component can be a processor (e.g., a microprocessor, a controller, or other processing circuitry), a process running on a processor, a controller, an object, an executable, a program, a storage device, a computer, a tablet PC and/or a user equipment (e.g., mobile phone, etc.) with a processing device. By way of illustration, an application running on a server and the server can also be a component. One or more components can reside within a process, and a component can be localized on one computer and/or distributed between two or more computers. A set of elements or a set of other components can be described herein, in which the term "set" can be interpreted as "one or more."

Further, these components can execute from various computer readable storage media having various data structures stored thereon such as with a module, for example. The components can communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising." Additionally, in situations wherein one or more numbered items are discussed (e.g., a "first X", a "second X", etc.), in general the one or more numbered items can be distinct, or they can be the same, although in some situations the context can indicate that they are distinct or that they are the same.

As used herein, the term "circuitry" can refer to, be part of, or include an Application Specific Integrated Circuit (ASIC), an electronic circuit, a processor (shared, dedicated, or group), or associated memory (shared, dedicated, or group) operably coupled to the circuitry that execute one or more software or firmware programs, a combinational logic circuit, or other suitable hardware components that provide the described functionality. In some embodiments, the circuitry can be implemented in, or functions associated with the circuitry can be implemented by, one or more software or firmware modules. In some embodiments, circuitry can include logic, at least partially operable in hardware.

As it is employed in the subject specification, the term "processor" can refer to substantially any computing processing unit or device including, but not limited to including, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions and/or processes described herein. Processors can exploit nano-scale architectures such as, but not limited to, molecular and quantum-dot based transistors, switches and gates, in order to optimize space usage or enhance performance of mobile devices. A processor can also be implemented as a combination of computing processing units.

Examples (embodiments) can include subject matter such as a method, means for performing acts or blocks of the method, at least one machine-readable medium including instructions that, when performed by a machine (e.g., a processor with memory, an application-specific integrated circuit (ASIC), a field programmable gate array (FPGA), or the like) cause the machine to perform acts of the method or of an apparatus or system for concurrent communication using multiple communication technologies according to embodiments and examples described herein.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data. Additionally, a computer program product can include a computer readable medium having one or more instructions or codes operable to cause a computer to perform functions described herein.

Communications media embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

An exemplary storage medium can be coupled to processor, such that processor can read information from, and write information to, storage medium. In the alternative, storage medium can be integral to processor. Further, in some aspects, processor and storage medium can reside in an ASIC. Additionally, ASIC can reside in a user terminal. In the alternative, processor and storage medium can reside as discrete components in a user terminal. Additionally, in some aspects, the processes and/or actions of a method or algorithm can reside as one or any combination or set of codes and/or instructions on a machine-readable medium and/or computer readable medium, which can be incorporated into a computer program product.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

In particular regard to the various functions performed by the above described components (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the disclosure. In addition, while a particular feature can have been disclosed with respect to only one of several implementations, such feature can be combined with one or more other features of the other implementations as can be desired and advantageous for any given or particular application.

What is claimed is:

1. A smart repeater (SMR), comprising:
a memory; and
a processing circuitry configured to, when executing instructions stored in the memory, cause the SMR to:
receive control information to manage power efficiency of a communication with a base station or a user equipment (UE), wherein the control information is received using a first beam and comprises an aggregation of different DCI bandwidth indicator fields of a plurality of SMRs that enable bandwidth adaptation among the plurality of SMRs, and at least one of: a component carrier (CC) index, a bandwidth part (BWP) identifier (ID), or a set of parameters to configure on-off operations of one or more bandwidths;
configure, based on the control information, a power control mechanism for transmission of the communication, wherein the power control mechanism includes bandwidth adaptation comprising transmission of the communication using a second beam that is narrower than the first beam; and
perform the communication with the base station or the UE using the second beam.

2. The SMR of claim 1, wherein the processing circuitry is further configured to:
in response to the control information comprising the CC index, perform the on-off operations based on a carrier aggregation of two or more CCs associated with different CC indices including the CC index, wherein the set of parameters include at least one of: an absolute radio frequency channel number (ARFCN), a CC bandwidth, or other frequency information for downlink communication and uplink communication.

3. The SMR of claim 2, wherein the processing circuitry is further configured to:
determine a CC of the two or more CCs as an SMR-default CC to be always powered on through the on-off operations with other CCs of the two or more CCs, wherein the SMR-default CC is determined based on an explicit indication of the CC, or an implicit indication of the CC based on a CC index or based on a successful cell search operation.

4. The SMR of claim 1, wherein the processing circuitry is further configured to:
in response to the control information comprising the BWP ID, perform the on-off operations, based on a plurality of BWPs, wherein the set of parameters includes at least one of: an absolute radio frequency channel number (ARFCN), a BWP bandwidth, or other frequency information for downlink communication and uplink communication.

5. The SMR of claim 4, wherein the processing circuitry is further configured to:
determine a BWP of the plurality of BWPs as an SMR-default BWP to be always powered on through the on-off operations with other BWPs of the plurality of BWPs, wherein the SMR-default BWP is determined based on an explicit indication of the BWP, or an implicit indication of the BWP that is based on a BWP index or based on a successful cell search operation.

6. The SMR of claim 1, further comprising:
an SMR Mobile Termination (SMR-MT) component configured to process data of a user-plane protocol layer via a backhaul link between the SMR and the base station;
an SMR Base Station (SMR-BS) component configured to process data of the user-plane protocol layer via an access link between the SMR and the UE; and
an SMR control unit (SMR-CU) component configured to receive the control information at a control-plane protocol layer for performing the on-off operations by activating/deactivating CCs or BWPs on the backhaul link and the access link, wherein an SMR-default CC of the CCs or an SMR-default BWP of the BWPs is always activated.

7. The SMR of claim 1, wherein the processing circuitry is further configured to:
activate and deactivate one or more SMR-CCs or one or more SMR-BWPs based on a medium access control (MAC) control element (MAC-CE), wherein the MAC CE is identified by a MAC sub-header with a dedicated logical channel ID (LCID) having a fixed size and comprises one or more fields that include a cell index associated with an SMR-CC of the one or more SMR-CCs or a BWP index associated with an SMR-BWP of the one or more SMR-BWPs indicating whether to deactivate the SMR-CC or the SMR-BWP.

8. The SMR of claim 1, wherein the processing circuitry is further configured to:
activate and deactivate one or more SMR-CCs or one or more SMR-BWPs based on a downlink control information (DCI) format of the control information, wherein a cyclic redundancy check (CRC) of the DCI format is scrambled based on a dedicated radio network temporary identifier (RNTI), or an identifier field in the DCI format comprises a predetermined value that identifies the DCI format.

9. The SMR of claim 8, wherein the processing circuitry is further configured to:
configure a search space set for monitoring the DCI format based on search space set parameters, a control channel element (CCE) aggregation level (AL) and candidates of the CCE AL, wherein the CCE AL is predetermined and the search space set parameters comprise a periodicity, an offset and a control resource set (CORESET), and wherein a time-domain location of the CORESET is limited to be within a predefined number of first symbols in a slot, a frequency location is limited to be within a bandwidth range of an SMR-default CC (SMR-DCC), or an SMR-default BWP (SMR-DBWP), or an explicit indication by an absolute radio frequency channel number (ARFCN).

10. The SMR of claim 1, wherein the control information comprises a bandwidth indicator field comprising one or more SMR-CC fields or SMR-BWP fields to trigger a CC based power control mechanism or a BWP based power control mechanism, wherein a location of the bandwidth indicator field for each SMR of the plurality of SMRs is indicated by higher layer signaling.

11. The SMR of claim 1, wherein the processing circuitry is further configured to:

in response to receiving a discontinuous reception (DRX) trigger signal, configuring a DRX monitoring cycle comprising a DRX active mode and a DRX inactive mode, and monitoring downlink communication only in the DRX active mode based on a set of DRX parameters comprising at least one of: a DRX cycle periodicity or one or more offset values; and powering off or entering a sleep mode to not monitor one or more CCs during the DRX inactive mode of the DRX monitoring cycle except for any symbols or slots being reserved by an indication of the DRX trigger signal.

12. The SMR of claim 11, wherein the processing circuitry is further configured to:

in response to the indication of the DRX trigger signal indicating one or more symbols or slots for a transmission of an SMR synchronous signal block (SMR-SSB) or an SMR channel state information reference signal (SMR-CSI-RS), or comprising a bitmap corresponding to the one or more symbols/slots, enabling a transmission or a reception during the DRX monitoring cycle based on the indication.

13. The SMR of claim 12, wherein the DRX trigger signal is configured to control the DRX monitoring cycle in a DCI format for one or more SMRs based on subsets of CCs of a plurality of CCs or a BWP based on at least one bit of the bitmap, wherein the DRX trigger signal in a DCI is configured with a DRX monitoring occasion for the DRX monitoring cycle and the DRX monitoring occasion is configured by RRC signaling prior to a first slot of the DRX monitoring cycle.

14. The SMR of claim 11, wherein the DRX trigger signal comprises an SMR channel state information reference signal (SMR-CSI RS) that configures tracking reference signal (TRS) or CSI-RS resources in a DRX monitoring occasion, a set of reserved TRS sequences, or a TRS sequence with an orthogonal cover code (OCC) to indicate activation or deactivation of at least one of: a subset of CCs of a plurality of CCs or one or more BWPs for one or more SMRs.

15. The SMR of claim 11, wherein the DRX trigger signal is based on a binary phase shift keying (BPSK) M sequence that configures carrier frequency checking and indicates activation or deactivation of at least one of: a subset of CCs of a plurality of CCs or one or more BWPs for one or more SMRs, wherein an M sequence of the BPSK M sequence is based on a number of resource elements (REs) mapped to the DRX trigger signal and at least one of: an SMR-CC group index or a BWP index.

* * * * *